(12) United States Patent
Bito

(10) Patent No.: US 7,530,596 B2
(45) Date of Patent: May 12, 2009

(54) AIRBAG APPARATUS

(75) Inventor: Kazuaki Bito, Aichi-ken (JP)

(73) Assignee: Toyoda Gosei Co., Ltd., Aichi-pref. (JP)

( * ) Notice: Subject to any disclaimer, the term of this patent is extended or adjusted under 35 U.S.C. 154(b) by 0 days.

(21) Appl. No.: 11/896,335

(22) Filed: Aug. 31, 2007

(65) Prior Publication Data
US 2008/0174094 A1 Jul. 24, 2008

(30) Foreign Application Priority Data
Sep. 6, 2006 (JP) .............................. 2006-241073

(51) Int. Cl.
*B60R 21/30* (2006.01)
(52) U.S. Cl. ...................... 280/739; 280/738; 280/743.2
(58) Field of Classification Search .............. 280/730.2, 280/731, 732, 738, 739, 743.2
See application file for complete search history.

(56) References Cited

U.S. PATENT DOCUMENTS

| | | | | |
|---|---|---|---|---|
| 6,454,300 | B1 * | 9/2002 | Dunkle et al. ................ | 280/742 |
| 6,513,835 | B2 * | 2/2003 | Thomas ..................... | 280/743.2 |
| 6,736,426 | B2 * | 5/2004 | Winters et al. ............. | 280/743.2 |
| 6,799,777 | B2 * | 10/2004 | Hawthorn et al. ............ | 280/742 |
| 6,832,778 | B2 * | 12/2004 | Pinsenschaum et al. ...... | 280/739 |
| 6,932,385 | B2 * | 8/2005 | Hawthorn et al. ............ | 280/739 |
| 7,374,205 | B2 * | 5/2008 | Thomas .................... | 280/743.2 |
| 7,377,546 | B2 * | 5/2008 | Fischer et al. ................ | 280/739 |
| 2005/0146122 | A1 * | 7/2005 | Gould et al. ................. | 280/739 |
| 2006/0290118 | A1 * | 12/2006 | Thomas ...................... | 280/739 |
| 2007/0187935 | A1 * | 8/2007 | Thomas et al. .............. | 280/739 |
| 2007/0194561 | A1 * | 8/2007 | Thomas .................... | 280/728.2 |
| 2007/0267855 | A1 * | 11/2007 | Lewis et al. ................. | 280/739 |

FOREIGN PATENT DOCUMENTS

| JP | A-2003-515483 | 5/2003 |
|---|---|---|
| WO | WO 01/34436 A1 | 5/2001 |

* cited by examiner

*Primary Examiner*—Toan C To
(74) *Attorney, Agent, or Firm*—Posz Law Group, PLC

(57) ABSTRACT

The airbag apparatus includes an airbag, a tether, a vent mechanism and an actuator. When the actuator is activated, a portion of the tether is retained by a movable member of the actuator to reduce the degree of protrusion of the airbag while the vent mechanism is released from the movable member to open up a vent opening and increase emission of inflation gas. When the actuator is inactive, the portion of the tether is detached from a position where the portion would otherwise be retained by the movable member to increase the degree of protrusion of the airbag while the vent mechanism is retained by the movable member to close off the vent opening and reduce the emission of gas. Further, the actuator may be activated at a delayed timing to open up the vent opening to increase the gas emission after the tether is configured to increase the protruding degree of the airbag.

4 Claims, 18 Drawing Sheets

AIRBAG APPARATUS

The present application claims priority from Japanese Patent Application No. 2006-241073 of Bito, filed on Sep. 6, 2006, the disclosure of which is hereby incorporated into the present application by reference.

BACKGROUND OF THE INVENTION

1. Field of the Invention

The present invention relates to an airbag apparatus including an airbag inflatable with inflation gas so as to project from a housing area. Particularly, the invention relates to an airbag apparatus suitably used for a front passenger's seat, a driver's seat, or for pedestrian protection, further including a tether connecting the housing area and the airbag and a mechanism for exhausting the inflation gas for controlling the projecting degree of the airbag from the housing area.

2. Description of Related Art

A conventional airbag apparatus is shown in JP 2003-515483A or WO01/34436A1. This airbag apparatus includes a tether and a ventilation mechanism in addition to an airbag inflatable to project from a housing area for protecting a vehicle occupant or a pedestrian. The tether connects the housing area and the airbag so as to control the projecting degree of the airbag projecting from the housing area. The ventilation mechanism lets out the inflation gas so as to control the pressure inside the airbag.

The tether of the above airbag apparatus has two modes of operation; an increased-protrusion mode to increase the protruding degree of the airbag from the housing area and a restrained-protrusion mode to lessen the protruding degree. Specifically, the airbag apparatus includes an actuator with a movable member proximate the housing, and the tether includes, at its end area closer to the housing, an engagement portion engageable with the movable member of the actuator. On the restrained-protrusion mode, the engagement portion of the tether is anchored by the movable member of the actuator so as to shorten the length of the tether from the housing area to the joint to the airbag. On the increased-protrusion mode, alternatively, the movable member of the actuator releases the engagement portion of the tether so as to extend the length of the tether.

The ventilation mechanism of the above airbag apparatus also has two modes of operation; a low-emission mode to suppress emission of the inflation gas and a high-emission mode to increase the emission relative to the low-emission mode. Specifically, the ventilation mechanism includes a vent opening formed on the housing and a valve body. The valve body normally leaves the vent opening open and moves to close off the same upon activation of the actuator. Further, the valve body is operable in conjunction with the movable member retaining the tether.

The above airbag apparatus is designed, when a vehicle occupant is of small stature seated proximate the airbag apparatus, not to activate the actuator upon airbag deployment so the tether is set in the restrained-protrusion mode while the ventilation mechanism is set in the high-emission mode, thereby deploying the airbag with reduced volume not giving undue pressure to the occupant. If the vehicle occupant is seated at normal position, on the contrary, the airbag apparatus is designed to activate the actuator upon airbag deployment so the tether is set in the increased-protrusion mode and the ventilation mechanism is set in the low-emission mode, thereby deploying the airbag with high volume and with adequately high inner pressure.

That is, the above airbag apparatus operates to shorten the length of the tether and open the vent opening, i.e., in combination of the restrained-protrusion mode and the high-emission mode when the actuator is inactive. On the other hand, when the actuator is activated, the airbag apparatus operates to extend the length of the tether and close off the vent opening, i.e., in combination of the increased-protrusion mode and the low-emission mode.

The above airbag apparatus has only two restraint patterns of the airbag attained by a single on-off control actuator; a restraint pattern of combination of the restrained-protrusion mode and the high-emission mode or another of combination of the increased-protrusion mode and the low-emission mode.

SUMMARY OF THE INVENTION

An object of the present invention is to provide an airbag apparatus capable of deploying its airbag in three restraint patterns in spite of employing only one on-off control actuator.

The airbag apparatus of the present invention includes an airbag inflatable with inflation gas and protrudes from a housing. The apparatus further includes an actuator, a control device, a vent mechanism and a tether. The actuator is disposed at the airbag housing and includes a movable member for movement from an initial position to an end position. The control device controls a feed of inflation gas to the airbag for inflation and an activation of the actuator. The vent mechanism is adapted to exhaust inflation gas and includes a vent opening formed on the housing and a valve body openably closing the vent opening for adjustment of emission of inflation gas to a low-emission mode or to a high-emission mode. The tether connects part of the housing and a location on the airbag. The tether includes at its end area closer to the housing an engagement portion engageable with the movable member of the actuator for adjustment of a degree of protrusion of the airbag from the housing to an increased-protrusion mode or to a restrained-protrusion mode.

The engagement portion of the tether is retained at a location near the housing such that: the engagement portion is detached from the location near the housing so as to preclude engagement between the engagement portion and the movable member of the actuator and thereby extending a length of the tether from the location of housing to a joint to the airbag to set the tether for the increased-protrusion mode when the airbag is inflated with the actuator inactivated to keep the movable member at the initial position; and such that the engagement portion is engaged with the movable member of the actuator unless detached from the location near the housing thereby shortening the length of the tether to set the tether for the restrained-protrusion mode when the airbag is inflated with the actuator activated.

The valve body is attached at a location near the housing such that: the valve body is engaged with the movable member to close off the vent opening and set the vent mechanism for a low-emission mode when the airbag is inflated with the actuator inactivated to keep the movable member at the initial position; and such that the valve body is disengaged from the movable member to open up the vent opening to set the vent mechanism for a high-emission mode upon activation of the actuator.

With above structure, when the airbag is inflated together with the activation of the actuator, the actuator operates to move the movable member from the initial position to the end position, so that the movable member retains the engagement portion of the tether. That is, the tether is set for the restrained-protrusion mode. In the meantime, if the movable member moves to the end position, it is disengaged from the valve body and allows the valve body to open, thereby setting the vent mechanism for the high-emission mode. Hence the airbag inflates with a suppressed internal pressure and small volume so it protects a vehicle occupant such as one positioned proximate the airbag apparatus with adequate cushioning effect and without giving the occupant undue pressure.

On the contrary, if the airbag is inflated with the actuator inactive, the movable member of the actuator stays at the initial position so the valve body remains retained by the movable member to close off the vent opening. That is, the vent mechanism is set for the low-emission mode. With respect to the tether, it is determined on the increased-protrusion mode where the tether is pulled by the inflating airbag and the engagement portion of the tether is detached from the position where it would otherwise be retained by the movable member so that the engagement portion is no longer engageable with the movable member. Hence the airbag inflates with a higher volume and high internal pressure so it will protect a vehicle occupant seated at normal or remote position relative to the airbag apparatus with a sufficient reaction force and adequate cushioning effect.

In the airbag apparatus of the present invention, furthermore, the actuator may be activated at this point when the airbag has been inflated with the increased-protrusion mode of the tether and the low-emission mode of the vent mechanism. Then the movable member of the actuator is moved from the initial position to the end position. At this time, the tether is kept in the increased-protrusion mode because the engagement portion of the tether has been removed from the position where it would otherwise be retained by the movable member. On the other hand, the shifted movable member releases the valve body so the valve body opens up the vent opening. That is, the vent mechanism turns to the high-emission mode from the low-emission mode halfway through the airbag inflation. As a result, the airbag keeps the high volume but reduces its internal pressure, which is an advantageous inflation mode for protecting for example an undersized occupant, particularly an undersized occupant seated at normal or remote position relative to the airbag apparatus since the airbag protects the occupant softly by suppressing a reaction force.

As described above, the airbag apparatus of the present invention performs three restraint patterns, i.e. a small-volume, high-emission restraint pattern where the actuator is activated together with airbag inflation so that the airbag deploys under combination of the restrained-protrusion mode of the tether and the high-emission mode of the vent mechanism, a high-volume, low or no-emission restraint pattern where the airbag is inflated with the actuator inactive so that the airbag deploys under combination of the increased-protrusion mode of the tether and the low-emission mode of the vent mechanism, and a high-volume, high-emission restraint pattern where the actuator is activated after airbag inflation or after disengagement of the engagement portion of the tether so that the airbag deploys under combination of the increased-protrusion mode of the tether and the high-emission mode of the vent mechanism.

Therefore, in the airbag apparatus of the present invention, the airbag is deployable in the above-described three restraint patterns in spite of employing only one on-off control actuator, by adding a control to turn on the actuator at delayed timing, thereby protecting a vehicle occupant properly depending on the seating position and/or physical size of the occupant.

By way of example, the above airbag apparatus may be designed to have a following specific structure. The movable member of the actuator is formed into a bifurcate configuration of a first retaining member to retain the tether and a second retaining member to retain the valve body. The engagement portion of the tether includes an annular collar into which a leading end of the first retaining member is inserted to retain the tether when the actuator is activated to move the movable member to the end position. The collar is retained at the location near the housing in such a manner as to detach from the location so as not to be retained by the first retaining member when the airbag is inflated with the actuator inactive. The leading ends of the first and second retaining members are oriented towards opposite directions from each other. The valve body includes an annular portion receiving the leading end of the second retaining member such that the valve body is retained by the second retaining member when the actuator remains inactive to keep the movable member at the initial position, and the leading end of the second retaining member is withdrawn from the annular portion of the valve body so as to allow the valve body to open up the vent opening when the actuator is activated to move the movable member to the end position.

With this structure, when the airbag is inflated together with the activation of the actuator, the leading end of the first retaining member of the actuator is put through the collar to retain the engagement portion of the tether, i.e., the tether is set for the restrained-protrusion mode. In the meantime, the leading end of the second retaining member of the actuator is withdrawn from the annular portion and allows the valve body to open up the vent opening, thereby setting the vent mechanism for the high-emission mode. That is, the airbag deploys in the small-volume, high-emission restraint pattern or the combination of the restrained-protrusion mode of the tether and the high-emission mode of the vent mechanism.

When the airbag is inflated with the actuator inactive, the engagement portion of the tether is detached from the position where it would otherwise be retained by the first retaining member since the movable member of the actuator stays at the initial position, so that the tether is set for the increased-protrusion mode. The valve body keeps closing the vent opening because the second retaining member of the movable member is not withdrawn from the retaining ring, so that the vent mechanism is set for the low-emission mode. Hence the airbag inflates in the high-volume, low or no-emission restraint pattern or the combination of the increased-protrusion mode of the tether and the low-emission mode of the vent mechanism.

Furthermore, if the actuator is activated halfway through the airbag inflation with the tether set for the increased-protrusion mode and the vent mechanism set for the low-emission mode, the leading end of the second retaining member of the actuator is withdrawn from the annular portion. Hence the valve body opens up the vent opening and the vent mechanism turns to the high-emission mode. As a result, the airbag completes inflation in the high-volume, high-emission restraint pattern or the combination of the increased-protrusion mode of the tether and the high-emission mode of the vent mechanism.

In addition to the above first valve body and the first vent opening, the vent mechanism may further include a second valve body and a second vent opening on the airbag housing. In this instance, the engagement portion of the tether is designed to include a stopping member for keeping the second valve body closing the second vent opening. The stopping member is moved by the movable member of the actuator to a position to retain the second valve body such that the second valve body keeps closing the second vent opening when the actuator is activated during the restrained-protrusion mode of the tether. Conversely, the stopping member is detached from the position to retain the second valve body when the airbag is inflated with the actuator inactive. The second valve body is helped to close off the second vent opening by being supported by the first valve body closing off the first vent opening in addition to by being retained by the stopping member upon the activation of the actuator. The second valve body opens up the second vent opening when the stopping member is detached from the position to retain the second valve body after the airbag started to inflate with the actuator inactive and then the actuator is activated to allow the first valve body to open up the first vent opening and stop supporting the second valve body.

According to this structure, when the airbag is inflated together with the activation of the actuator, the actuator operates to move the movable member so it retains the engagement portion of the tether and thereby setting the tether for the restrained-protrusion mode while stops retaining the first valve body and allows the first valve body to open, thereby setting the vent mechanism for the high-emission mode. At this time, the second valve body is no longer supported by the first valve body. However, the second valve body keeps closing the second vent opening since the stopping member which has moved along with the movement of the movable member now retains the annular portion. That is, the airbag deploys in the restrained-protrusion mode and in the high-emission mode where the first vent opening is open whereas the second vent opening is closed. Hence the airbag inflates with a suppressed internal pressure and small volume so it protects a vehicle occupant positioned proximate the airbag apparatus with adequate cushioning effect and without giving the occupant undue pressure.

If the airbag is inflated with the actuator inactive, the movable member of the actuator stays at the initial position so the first valve body remains retained by the movable member to close off the first vent opening. Moreover, the first valve body holds the second valve body to close off the second vent opening. That is, the vent mechanism is set for the low-emission mode. With respect to the tether, it is determined on the increased-protrusion mode where the tether is pulled by the inflating airbag and the engagement portion of the tether is detached from the position where it would otherwise be retained by the movable member so that the engagement portion is no longer engageable with the movable member. Hence the airbag inflates with a high volume and high internal pressure so it protects a vehicle occupant seated at normal or remote position relative to the airbag apparatus with a sufficient reaction force and adequate cushioning effect. At this time, the stopping member to retain the second valve body is removed together with the engagement portion and leaves the second valve body unretained.

The actuator is activated at this point, i.e., at the increased-protrusion mode of the tether and the low-emission mode of the vent mechanism. Then the tether is kept in the increased-protrusion mode because the engagement portion of the tether has been removed from the position where it would otherwise be retained by the movable member. With respect to the vent mechanism, the first valve body opens up the first vent opening because the movable member stops retaining the first valve body. The second valve body opens the second vent opening, too, because the stopping member has been moved away from the position to retain the second valve body and the first valve body has moved to open the first vent opening and no longer holds the second valve body. That is, the vent mechanism switches to the maximum-emission mode from the low-emission mode halfway through the airbag inflation. As a result, the airbag keeps the high volume but considerably reduces internal pressure, which is an advantageous inflation mode for protecting, for example, an undersized occupant seated at normal or remote position relative to the airbag apparatus since the airbag protects the occupant softly by suppressing a reaction force.

That is, according to the above structure, the airbag has three restraint patterns, i.e. a small-volume, high-emission restraint pattern where the actuator is activated together with airbag inflation so that the airbag deploys under combination of the restrained-protrusion mode of the tether and the high-emission mode of the vent mechanism, a high-volume, low or no-emission restraint pattern where the airbag is inflated with the actuator inactive so that the airbag deploys under combination of the increased-protrusion mode of the tether and the low-emission mode of the vent mechanism, and a high-volume, maximum-emission restraint pattern where the actuator is activated after airbag inflation or after disengagement of the engagement portion of the tether so that the airbag deploys under combination of the increased-protrusion mode of the tether and the maximum-emission mode of the vent mechanism.

It will also be appreciated to structure the airbag apparatus as follows: the movable member of the actuator is formed into a bifurcate configuration of a first retaining member to retain the tether and a second retaining member to retain the first valve body. The first retaining member and the second retaining member are oriented toward opposite directions from each other at their leading ends. The first valve body includes an annular portion receiving the leading end of the second retaining member such that the first valve body is retained by the second retaining member when the actuator remains inactive to keep the movable member at the initial position. The leading end of the second retaining member is removed from the annular portion of the first valve body so as to allow the first valve body to open up the first vent opening when the actuator is activated to move the movable member to the end position. The engagement portion of the tether includes an annular collar for receiving the leading end of the first retaining member so as to be retained by the first retaining member, and a stopping member is fitted inside the collar in a detachable manner before the activation of the actuator. The collar is retained at the location near the housing in such a manner as to detach from the location together with the stopping member so as not to be retained by the first retaining member when the airbag is inflated with the actuator inactive. On the contrary, the stopping member is pushed out of the collar by the leading end of the first retaining member moved to be inserted through the collar to retain the tether when the actuator is activated to move the movable member to the end position. The first vent opening and the second vent opening are arranged to form a single communicated opening. The first valve body is disposed rotatably about a pivot portion formed on a periphery of the first vent opening and the second valve body is disposed rotatably about a pivot portion formed on a periphery of the second vent opening, and the second valve body is supported at its leading end area by a region of the first valve body between the pivot portion and a leading end of the first valve body and thereby closing off the second vent opening. The second valve body includes a holding member holding the collar toward the airbag housing in a detachable manner, and an annular portion adapted to be retained by the stopping member pushed out of the collar by the leading end of the first retaining member when the actuator is activated to move the movable member to the end position such that the second vent opening is kept closed.

According to the above structure, when the actuator is activated along with airbag inflation, the leading end of the first retaining member of the actuator is inserted through the collar to retain the engagement portion of the tether, thereby setting the tether for the restrained-protrusion mode. In the meantime, the leading end of the second retaining member of the actuator is withdrawn from the annular portion of the first valve body and allows the first valve body to open up the first vent opening, thereby setting the vent mechanism for the high-emission mode. The second valve body keeps closing the second vent opening because the stopping member, which has been pushed out of the collar when the leading end of the first retaining member was inserted through the collar, now retains the annular portion of the second valve body. That is, the airbag completes inflation in the small-volume, high-emission restraint pattern or the combination of the restrained-protrusion mode of the tether and the high-emission mode of the vent mechanism.

When the airbag is inflated with the actuator inactive, the engagement portion of the tether is moved away since the leading end of the first retaining member does not move to be inserted into the collar, so that the tether is set for the increased-protrusion mode. The first valve body keeps closing the first vent opening because the second retaining member of the actuator is not withdrawn from the annular portion of the first valve body, so that the vent mechanism is set for the low-emission mode. Further, the second valve body keeps closing the second vent opening because its leading end area is held down by the above-described region of the first valve body. Hence the airbag inflates in the high-volume, low or no-emission restraint pattern, i.e., under combination of the increased-protrusion mode of the tether and the low-emission mode of the vent mechanism.

Furthermore, if the actuator is activated halfway through the airbag inflation with the tether set for the increased-protrusion mode and the vent mechanism set for the low-emission mode, the leading end of the second retaining member of the actuator is withdrawn from the annular portion of the first valve body. Hence the first valve body opens up the first vent opening and the second valve body opens up the second vent opening because the first valve body no longer holds down the leading end area of the second valve body. That is, the vent mechanism turns to the maximum-emission mode with both vent openings open from the low-emission mode. As a result, the airbag completes inflation in the high-volume, maximum-emission restraint pattern, i.e., under the combination of the increased-protrusion mode of the tether and the maximum-emission mode of the vent mechanism.

It is desired that the airbag of the present invention includes an occupant side wall at its rear end area protruding rearward upon deployment for restraint of an occupant. An end area of the tether joined to the airbag is joined to a laterally central area of the occupant side wall such that the tether makes the laterally central area recessed forward upon airbag deployment. The occupant side wall is designed to be recessed at the laterally central area even when the airbag is deployed in the increased-protrusion mode of the tether.

According to the above structure, regions of the occupant sidewall on the left and right sides of the recessed area absorb changes of lateral width of the airbag irrespective of whether the tether is set for the increased-protrusion mode or for the restrained-protrusion mode. More specifically, for example, describing the restrained-protrusion mode of the airbag where the tether is shortened on the basis of the increased-protrusion mode where the tether is extended, the recessed area is deeper by the shortened length of the tether. At this time, the airbag protrudes relatively less rearward in a fully inflated state, which seems likely to increase the lateral width of the airbag. However, the circumferential wall of the airbag which would otherwise unfurl toward the left and right is pulled toward the recess recessing deep forward at the lateral center of the occupant side wall. Accordingly, the lateral width of the airbag is not increased, so that the airbag deploys without a change of the lateral width of the occupant side wall both in the increased-protrusion mode and in the restrained-protrusion mode. As a result, the lateral width of the restraint area of the airbag is stabilized between the deployment modes of the airbag.

BRIEF DESCRIPTIONS OF DRAWINGS

Figure 1:
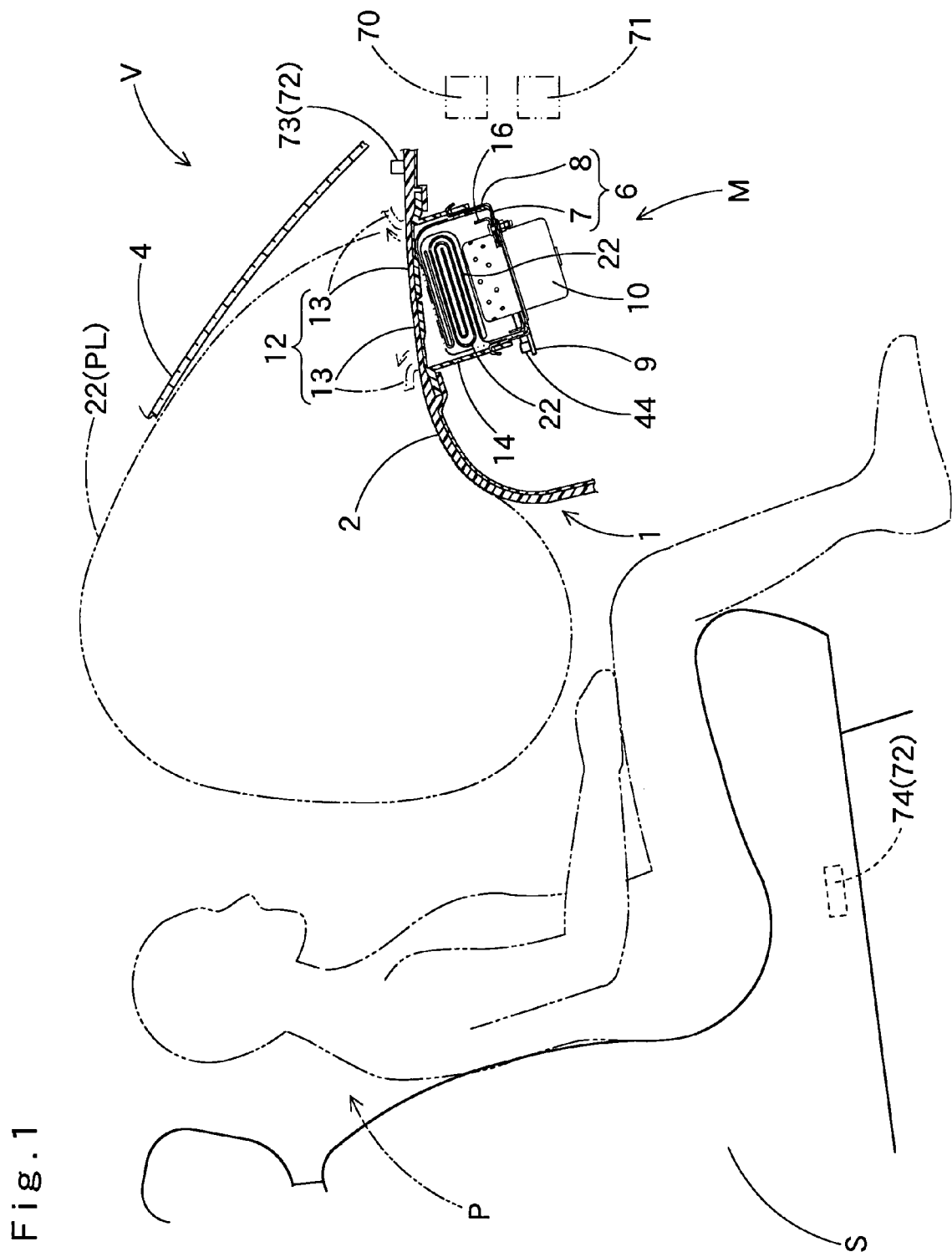
FIG. 1 is a schematic vertical section of an airbag apparatus embodying the present invention in use taken along the longitudinal direction of a vehicle.
Figure 4:
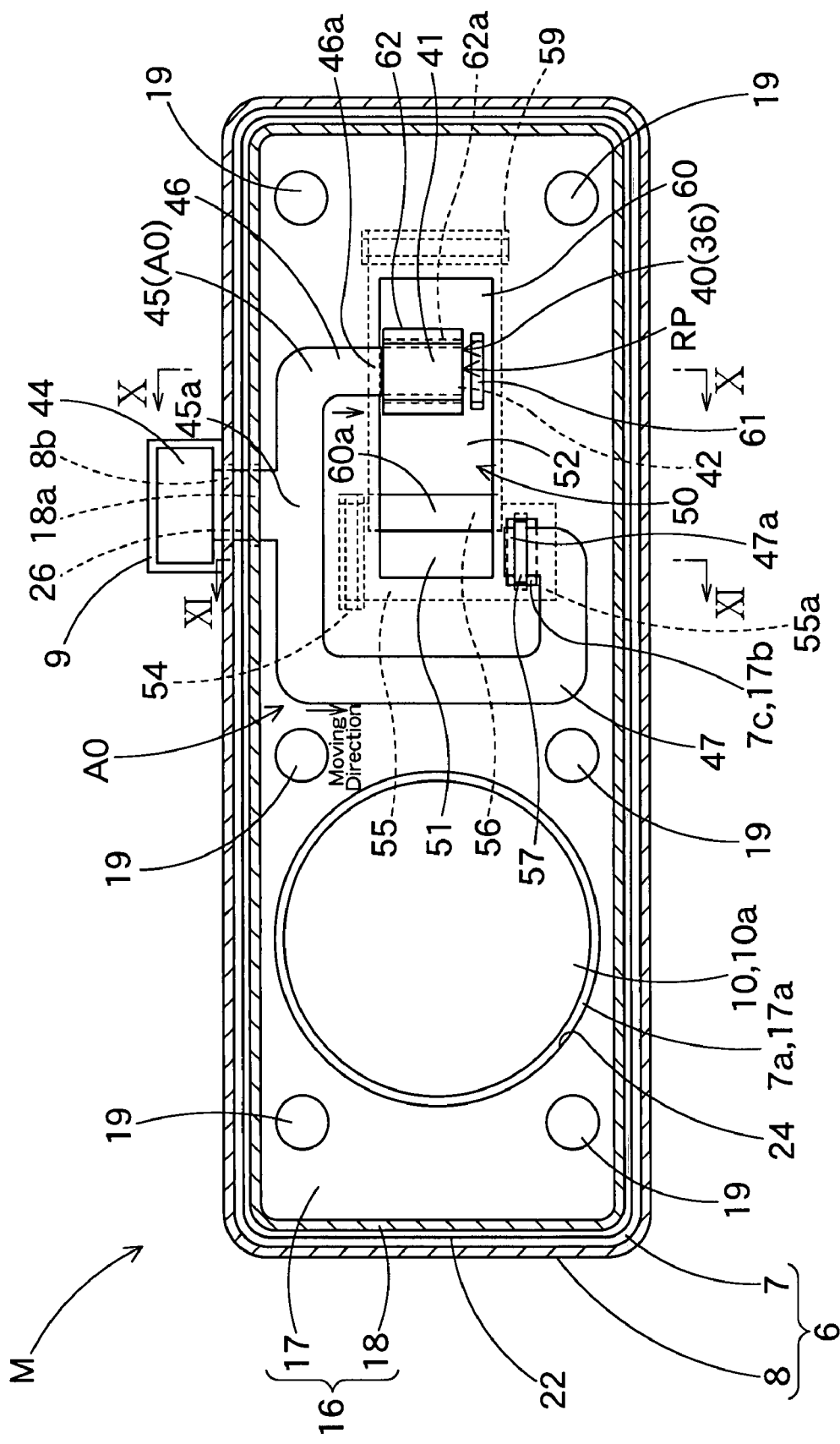
FIG. 4 is a schematic cross section of the airbag apparatus of FIG. 1 taken along line IV-IV of FIG. 3.
Figure 10A:
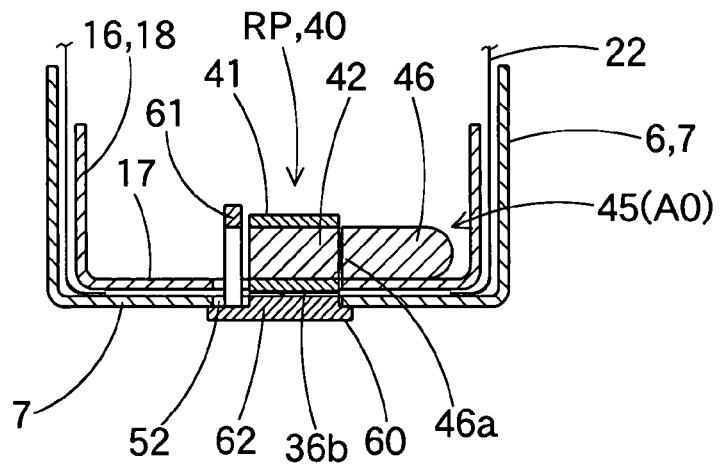
Figure 10B:
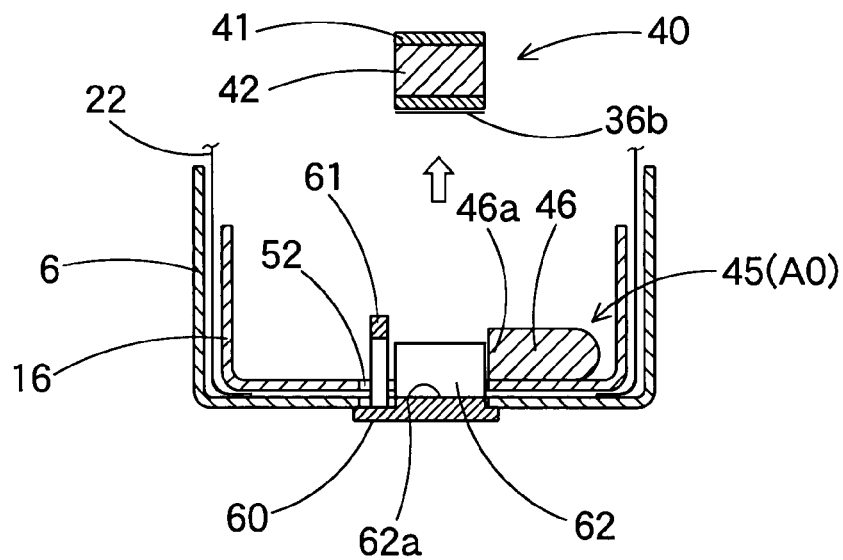
Figure 10C:
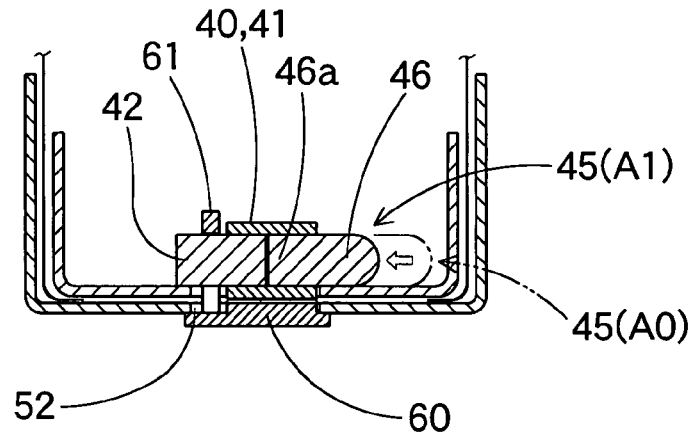
Figure 11A:
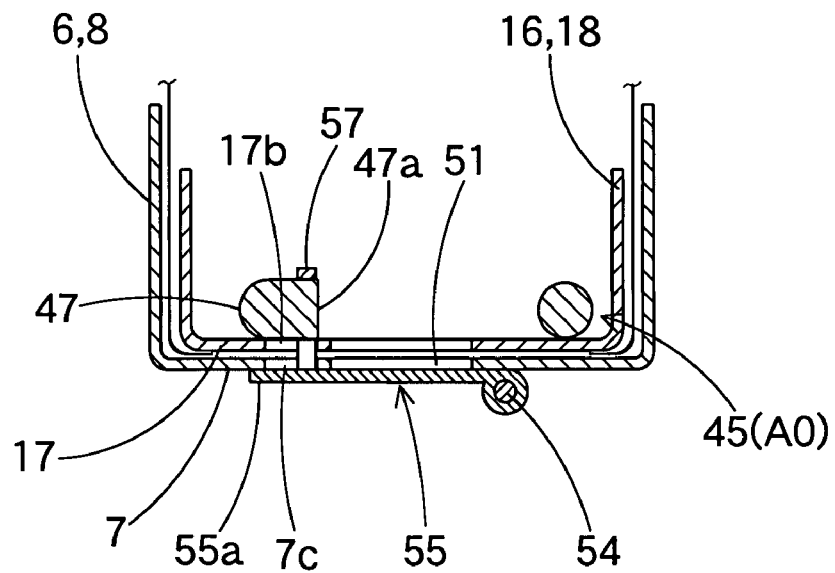
Figure 11B:
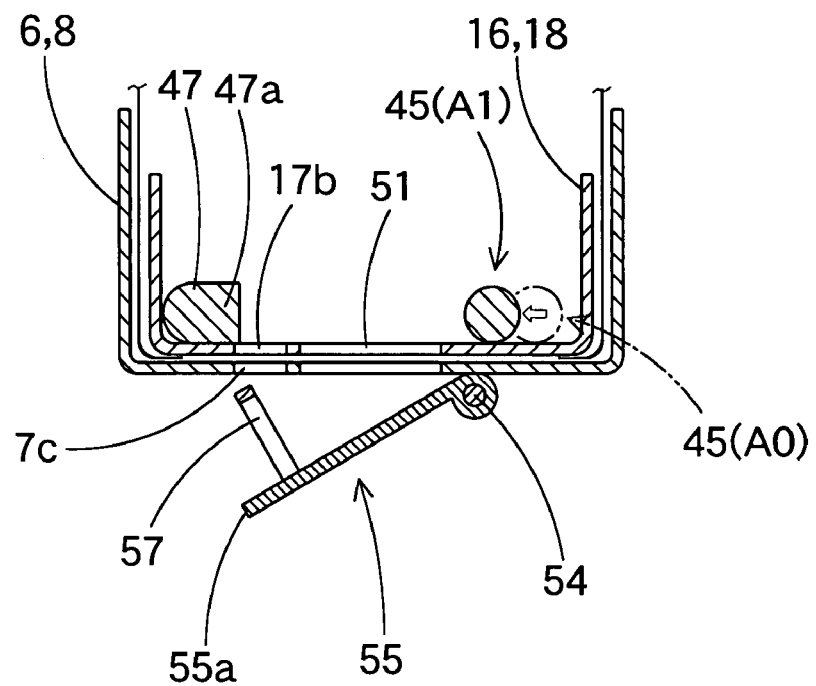
Figure 12:
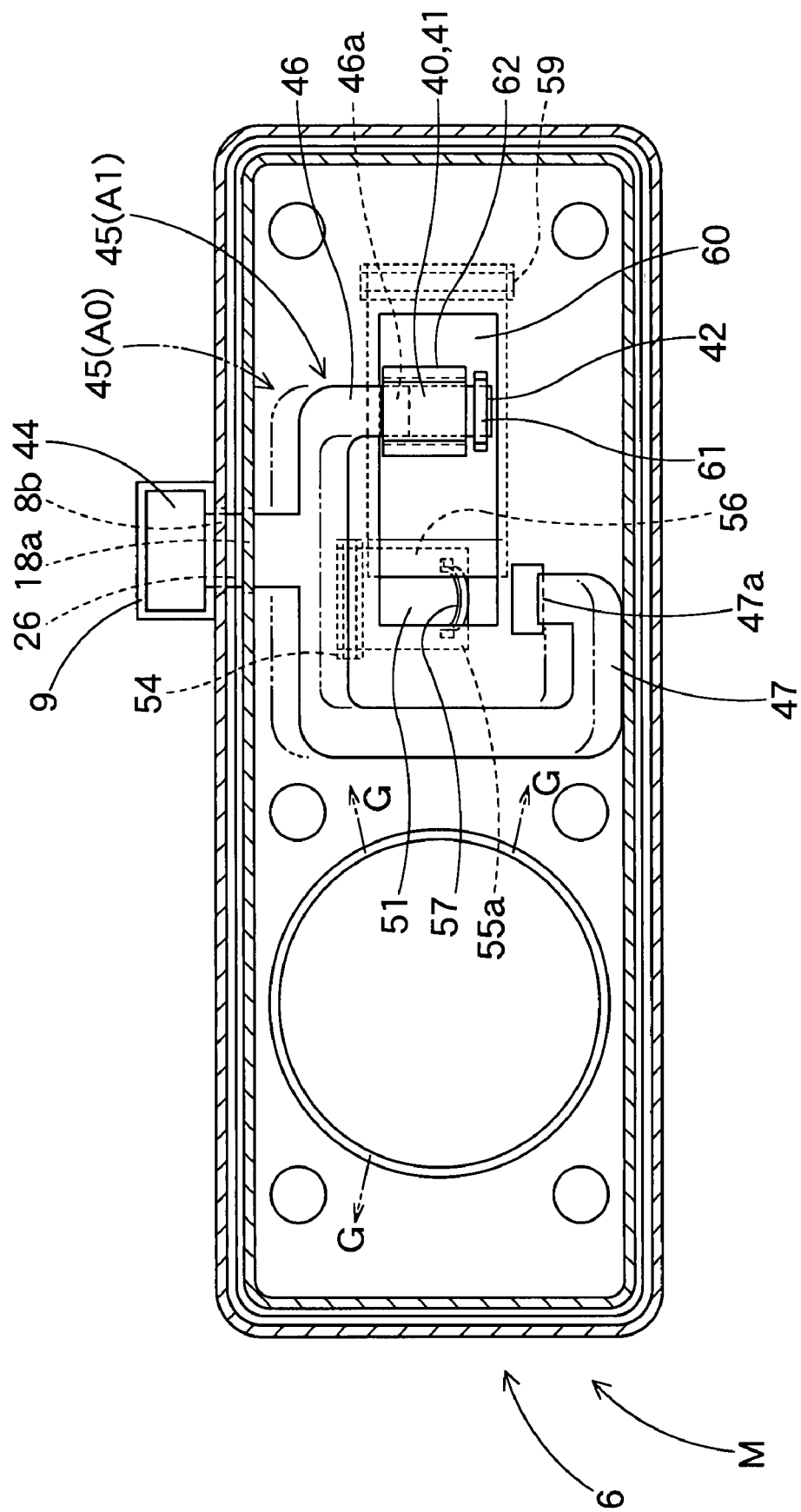
Figure 13:
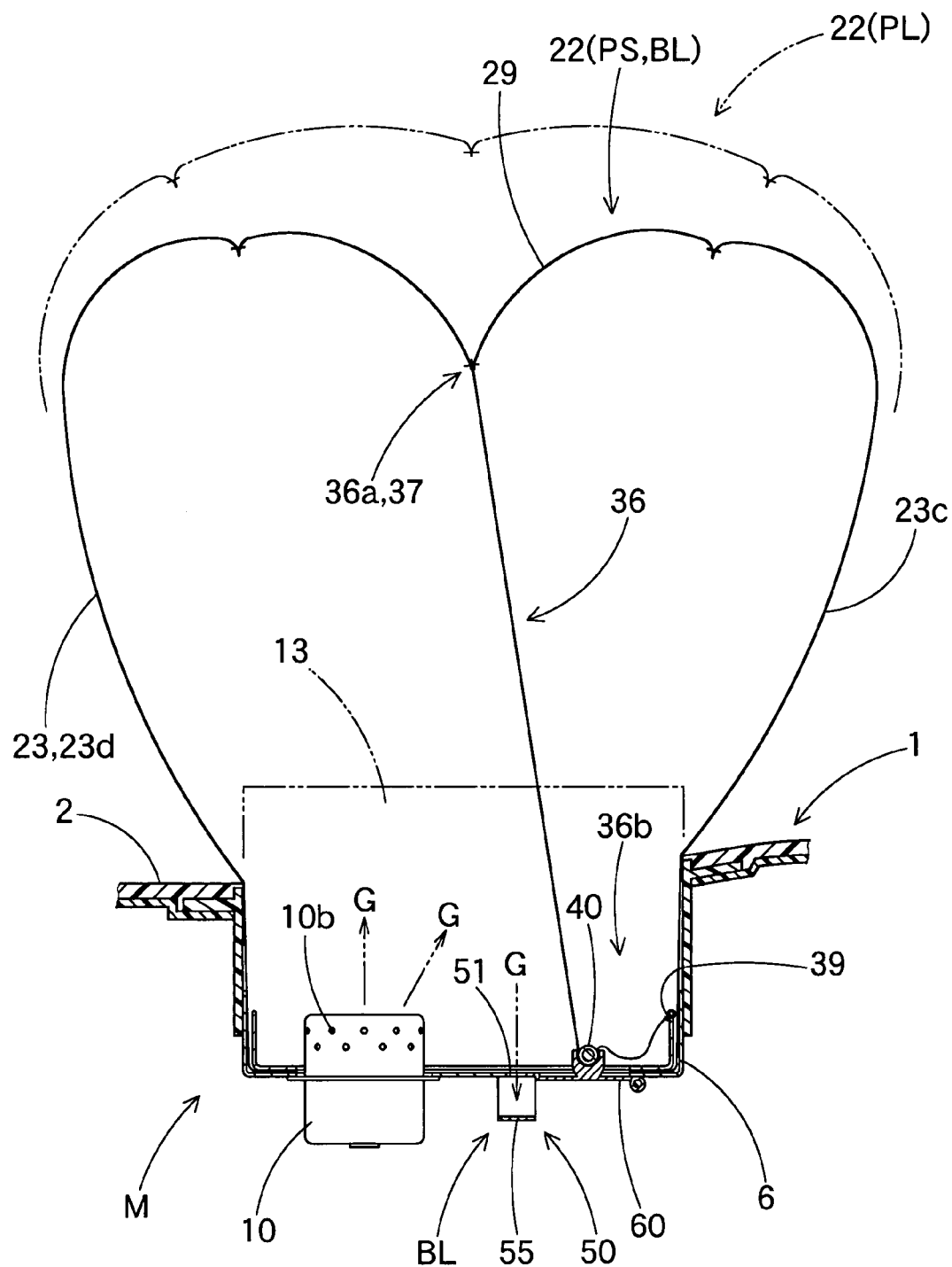
Figure 14:
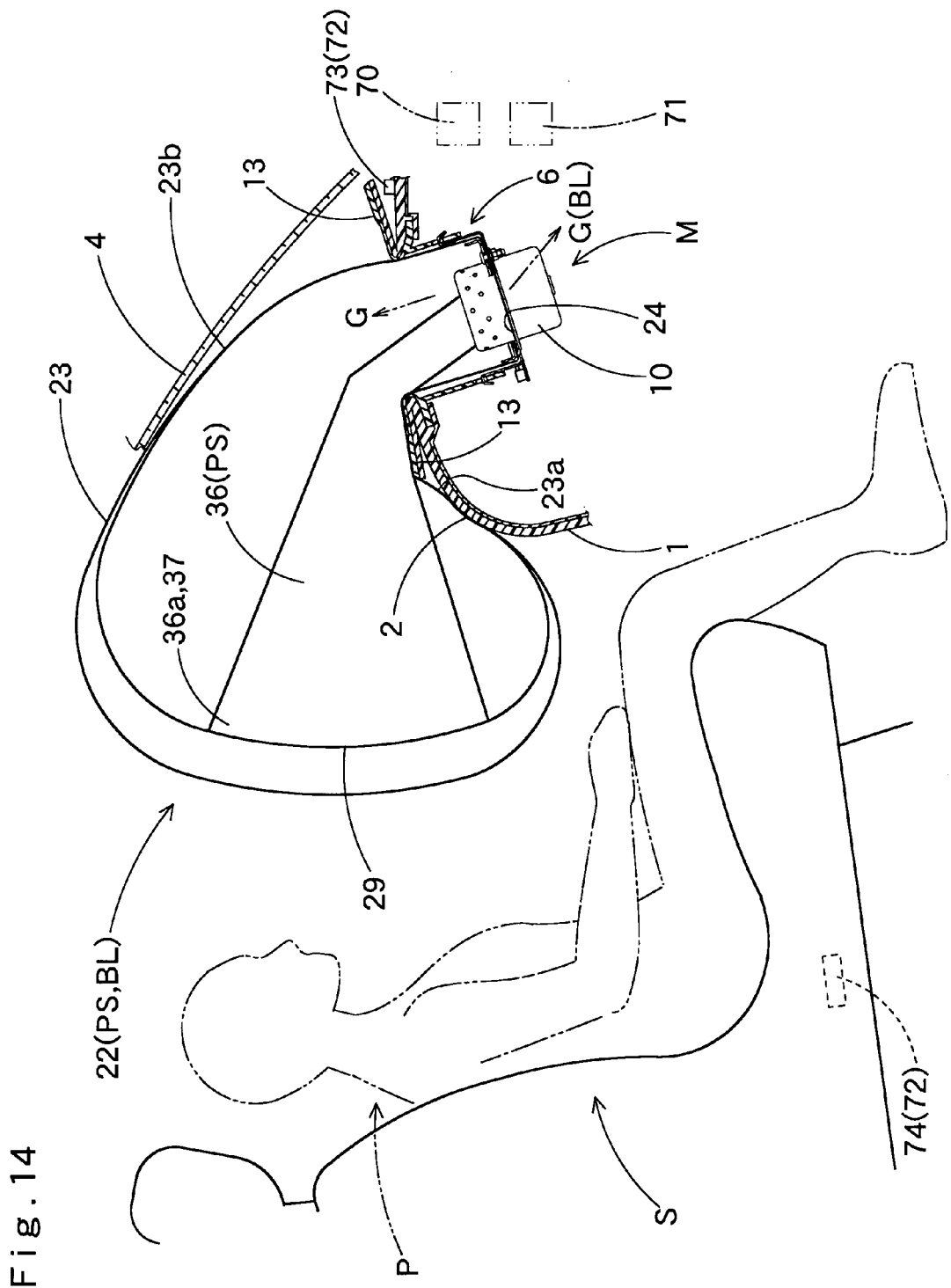
Figure 15:
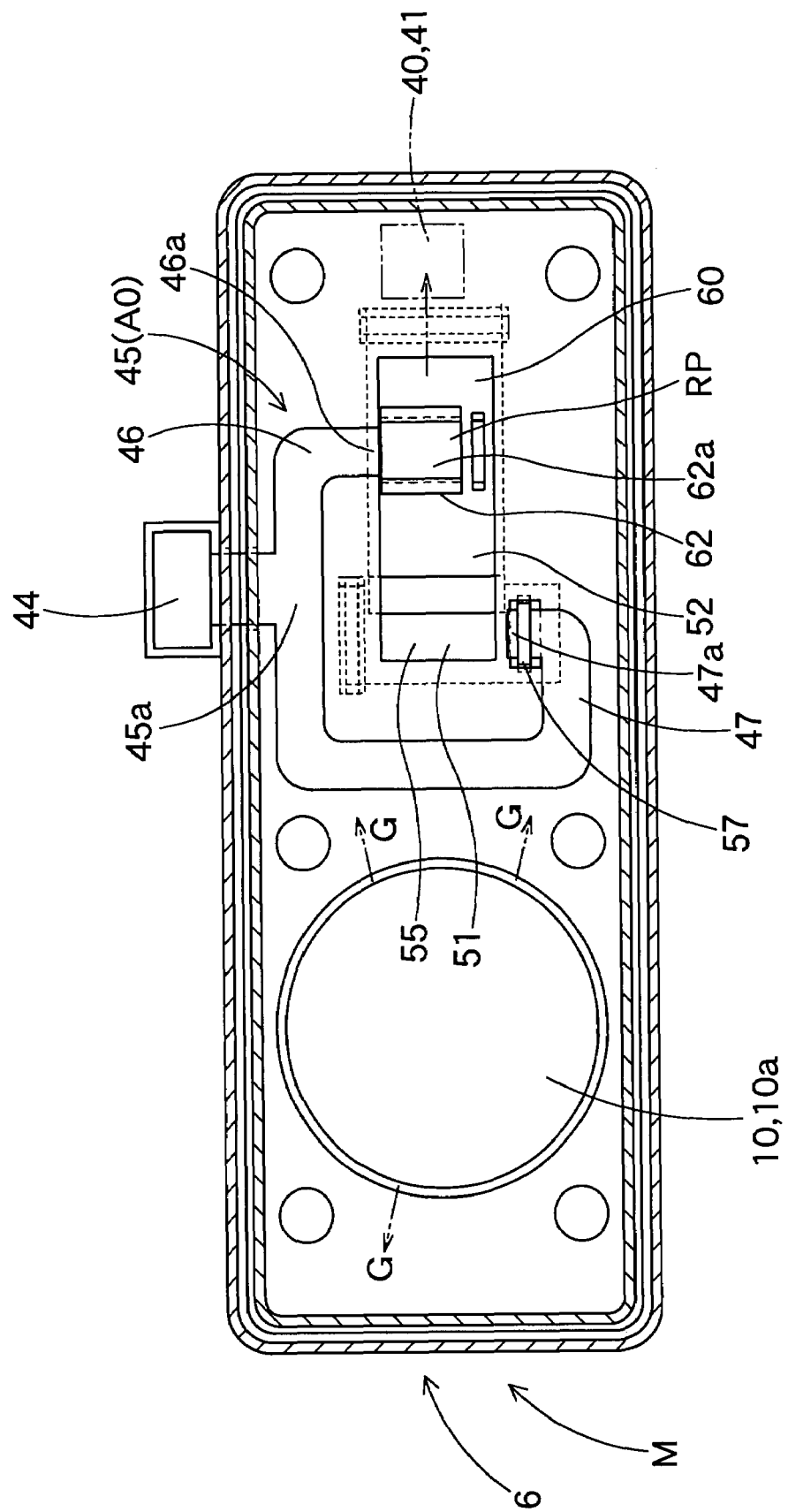
Figure 16:
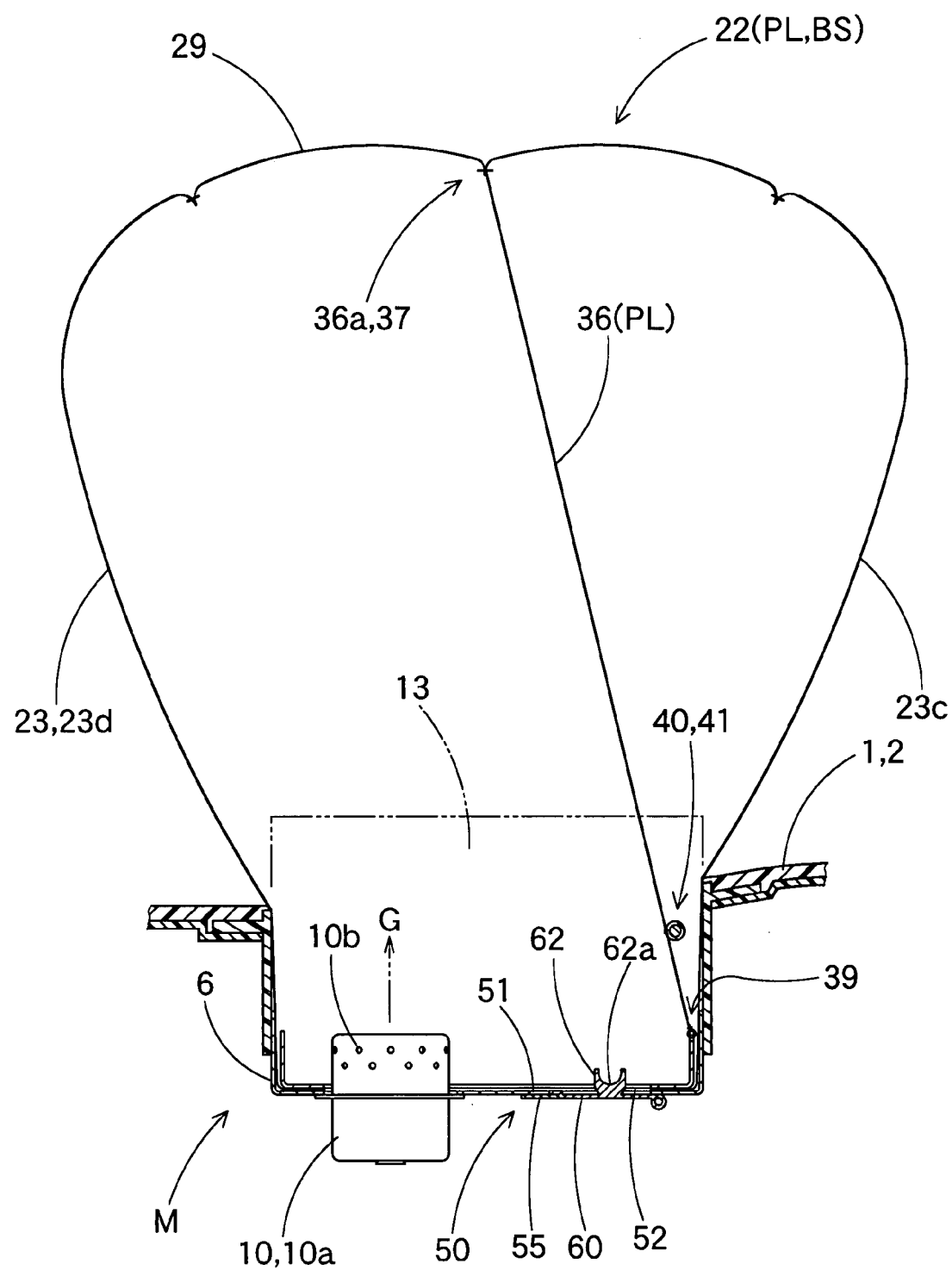
Figure 17:
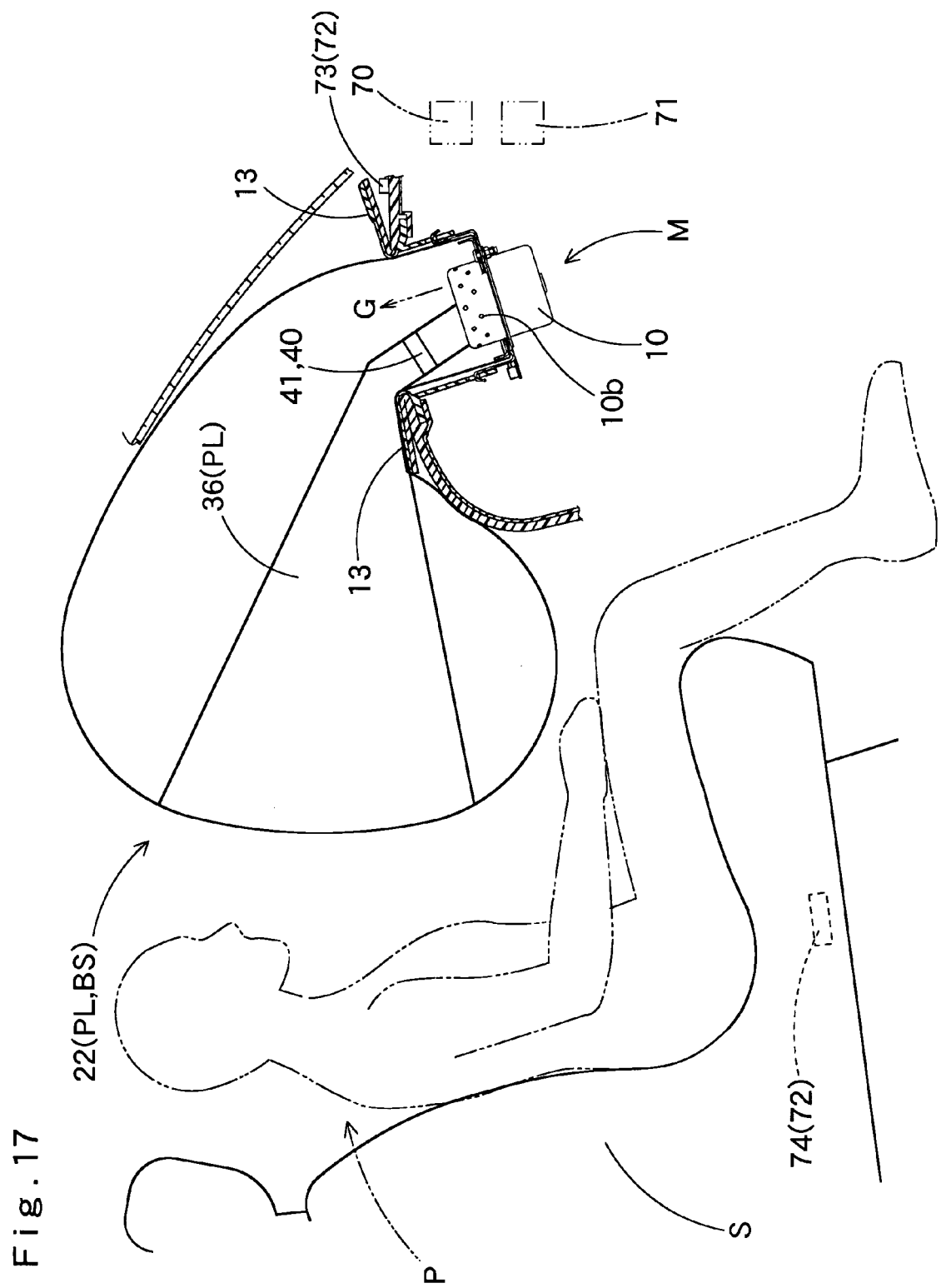
Figure 18:
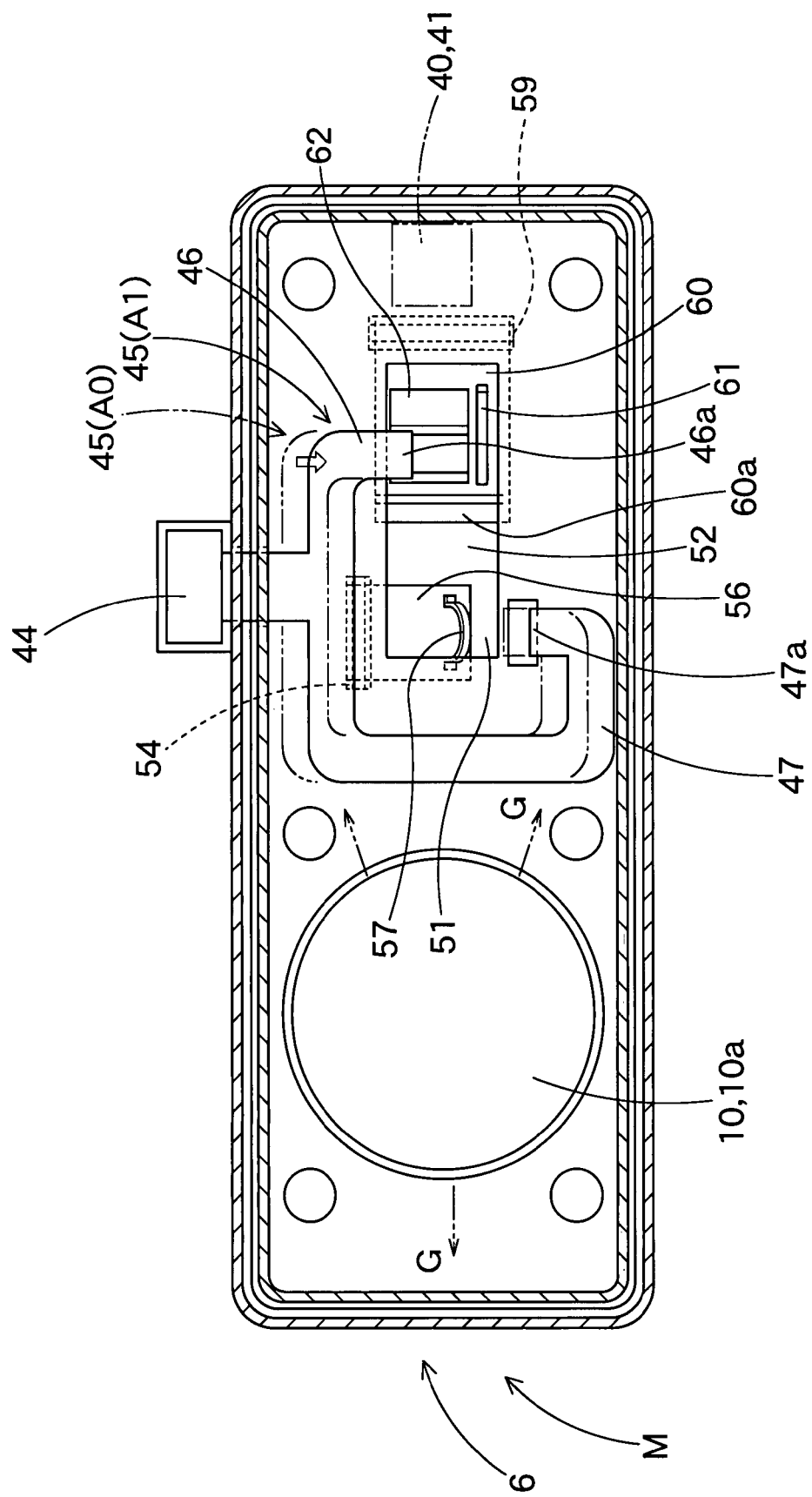
Figure 19:
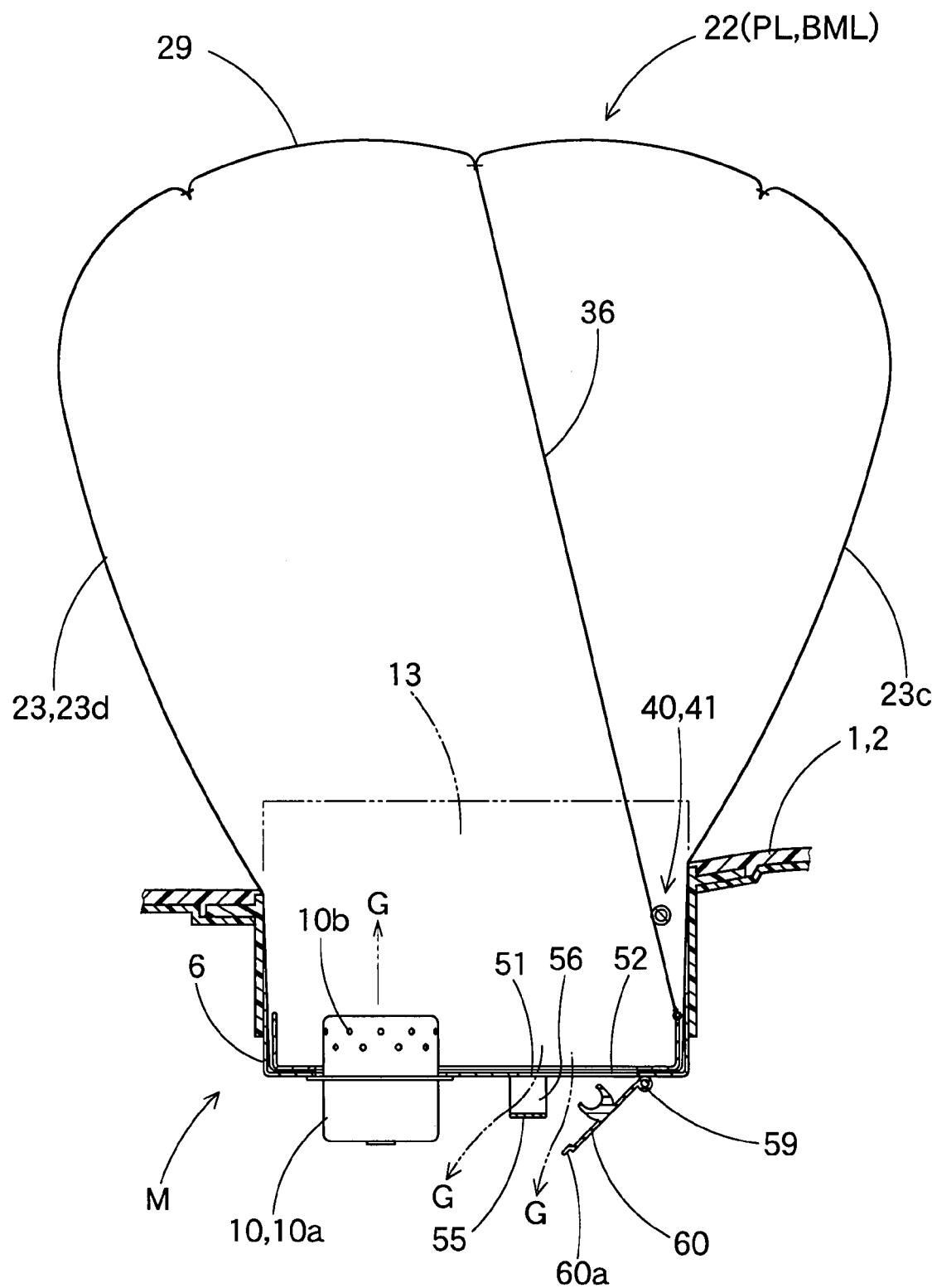
Figure 20:
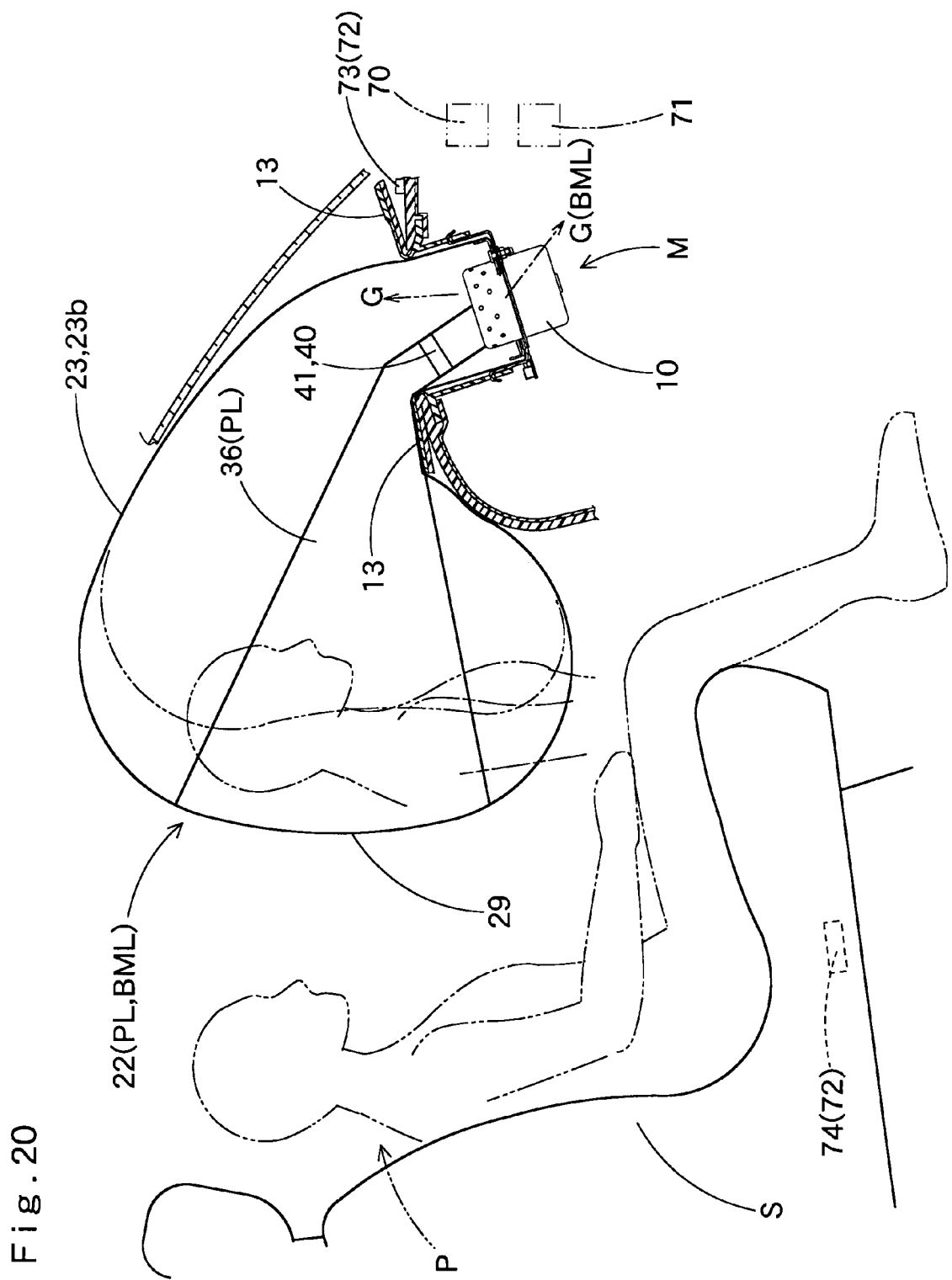

FIGS. 10A, 10B and 10C schematically illustrate initial positions, disengagement, and engagement of a movable member of an actuator and an engagement portion of a tether by sectional views taken along line X-X of FIG. 4;

FIGS. 11A and 11B schematically illustrate initial positions and disengagement of the movable member of the actuator and a (first) valve body by sectional views taken along line XI-XI of FIG. 4;

FIG. 12 is a schematic plan view of the actuator in operation;

FIG. 13 is a schematic cross section of the airbag apparatus of FIG. 1 in operation, particularly showing the way the airbag is inflated when the actuator is activated;

FIG. 14 is a schematic vertical section of the airbag apparatus of FIG. 1 in operation, particularly showing the way the airbag is inflated when the actuator is activated;

FIG. 15 is a schematic plan view of the airbag apparatus of FIG. 1 with the actuator in an inactive condition;

FIG. 16 is a schematic cross section of the airbag apparatus of FIG. 1 in operation, particularly showing the way the airbag is inflated when the actuator is inactive;

FIG. 17 is a schematic vertical section of the airbag apparatus of FIG. 1 in operation, particularly showing the way the airbag is inflated when the actuator is inactive;

FIG. 18 is a schematic plan view of the airbag apparatus of FIG. 1 in which the actuator turned to activated condition from the inactive condition after the activation of the airbag apparatus;

FIG. 19 is a schematic cross section of the airbag apparatus of FIG. 1, particularly showing the way the airbag is inflated when the actuator turned to activated condition from the inactive condition after the activation of the airbag apparatus; and FIG. 20 is a schematic vertical section of the airbag apparatus of FIG. 1, particularly showing the way the airbag is inflated when the actuator turned to activated condition from the inactive condition after the activation of the airbag apparatus.

DESCRIPTION OF PREFERRED EMBODIMENTS

Preferred embodiments of the present invention are now described below with reference to the accompanying drawings. However, the invention is not limited to the embodiments disclosed herein. All modifications within the appended claims and equivalents relative thereto are intended to be encompassed in the scope of the claims.

As shown in FIG. 1, an airbag apparatus M embodying the present invention is illustrated for descriptive purposes as is mounted in front of a front passenger's seat. The airbag apparatus M is mounted on an interior of a top plane 2 of an instrument panel or dashboard 1, and is operable under control of a control device 70.

The control device 70 is connected with a crash sensor 71 such as an acceleration sensor for monitoring the deceleration of a vehicle V upon an actual impact and one or more occupant sensors 72 for monitoring the seating position and/or weight of an occupant P. In the foregoing embodiment, a position sensor 73 measuring a distance between the airbag apparatus M and the occupant P seated in a front passenger's seat S and a weight sensor 74 determining the weight of the seated occupant P are used as the occupant sensors 72 by way of example. The control device 70 activates the airbag apparatus M upon detection of an impact on the vehicle V based upon signals fed from the crash sensor 71. The control device 70 also determines whether or not to activate a later-described actuator 44, and when determined to activate, determines the timing to activate the actuator 44, based upon signals fed from the position sensor 73 and the weight sensor 74 so that the airbag 22 is inflated in a desirable restraint pattern.

Figure 2:
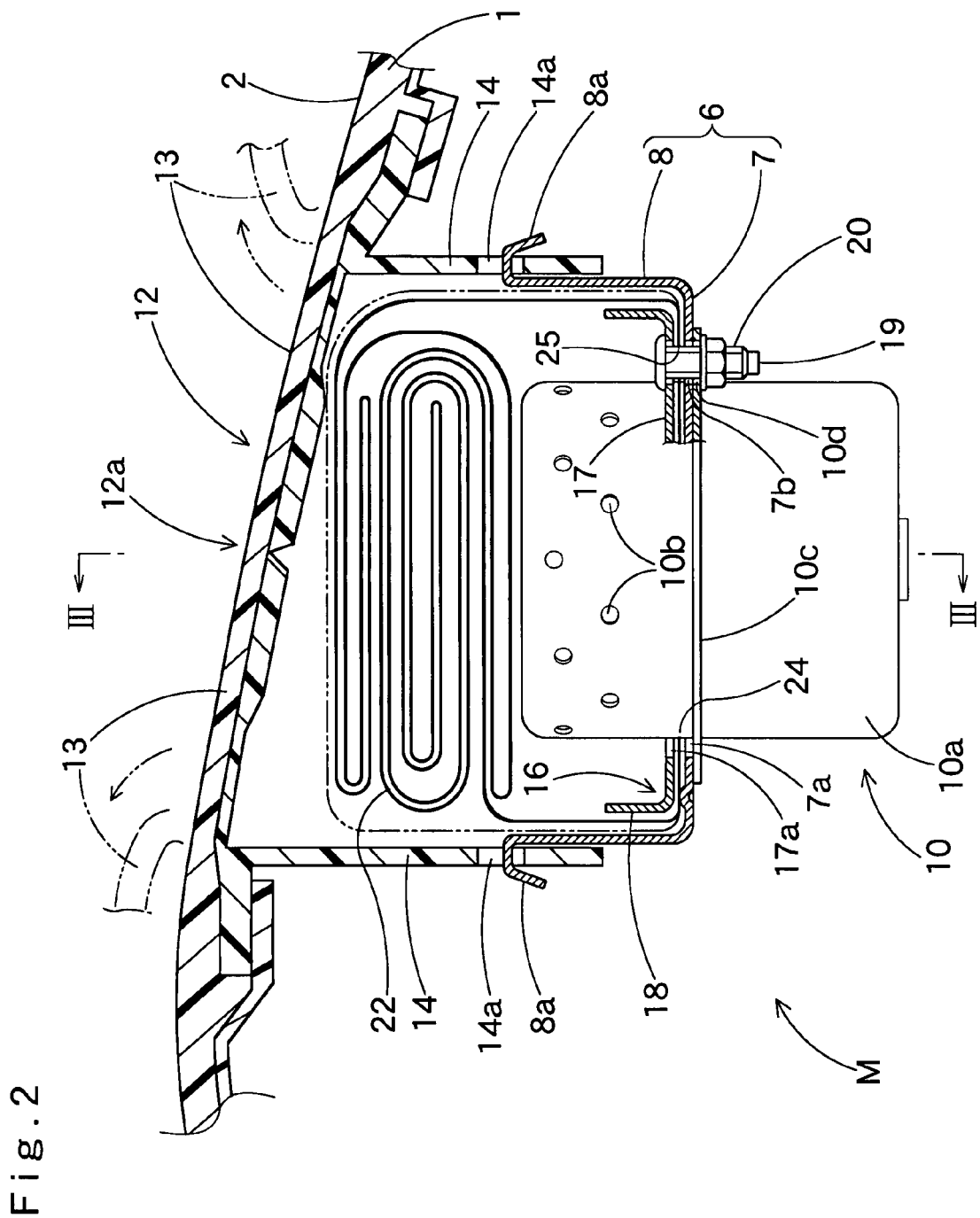
FIG. 2 is a schematic enlarged vertical section of the airbag apparatus of FIG. 1 taken along the longitudinal direction of the vehicle.
Figure 3:
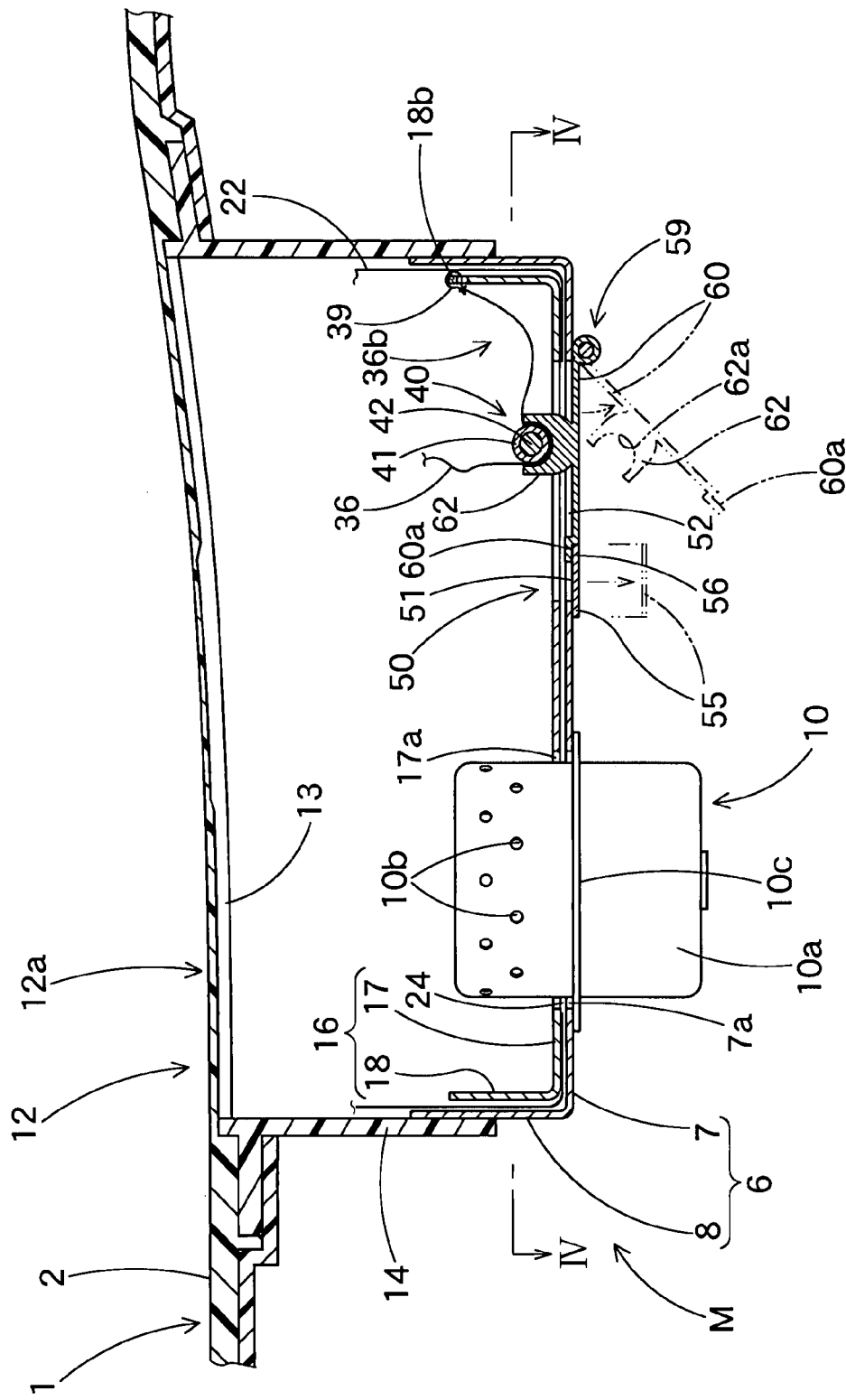
FIG. 3 is a schematic enlarged vertical section of the airbag apparatus of FIG. 1 taken along line III-III of FIG. 2.

As shown in FIGS. 1-3, the airbag apparatus M includes a folded airbag 22, an inflator 10 for supplying the airbag 22 with inflation gas, a case 6 housing and holding the airbag 22 and the inflator 10, a retainer 16 for attachment of the airbag 22 to the case 6, and an airbag cover 12 coupled with the case 6 to cover the folded airbag 22. The airbag apparatus M further includes a tether 36, a vent mechanism 50, and an actuator 44 as shown in FIGS. 3, 4, 12, 13 and 16. The tether 36 connects a location on or proximate the case 6 and a location on the airbag 22 as shown in FIGS. 3, 13 and 16, so that the projecting degree of the inflated airbag 22 is controlled. The vent mechanism 50 allows the inflation gas G to flow out of the case 6. The actuator 44 operates to adjust the operative length of the tether 36 and the emission of the inflation gas G.

As shown in FIGS. 1-4, the case 6 is made of sheet metal for accommodating the folded airbag 22. The case 6 has a generally rectangular parallelepiped shape and includes a bottom wall 7 having a generally rectangular plate shape and a circumferential wall 8 extending upward from an outer edge of the bottom wall 7. The bottom wall 7 is provided with a round opening 7a for insertion of a body 10a of the inflator 10 and through holes 7b disposed around the opening 7a for receiving bolts 19 of the retainer 16. The bottom wall 7 is further provided with a first vent opening 51 and a second vent opening 52 which are part of the vent mechanism 50, and an insert hole 7c for receiving a later-described retaining ring 57 (FIG. 11) of a first valve body 55 from the lower side. The bottom wall 7 is further provided with unillustrated brackets for attachment of the airbag apparatus M to the vehicle body structure.

The circumferential wall 8 of the case 6 is provided with a plurality of lugs 8a on the top for retaining a later-described joint wall 14 of the airbag cover 12 (FIG. 2), and is provided with an insert hole 8b on a region near the bottom wall 7 for receiving a movable member 45 of the actuator 44 (FIG. 4). The circumferential wall 8 further includes a platform 9 disposed in an outwardly projecting manner, and to which platform 9 the actuator 44 is attached.

The inflator 10 is activated by the control device 70 when the control device 70 detects an impact of the vehicle V based on signals from the crash sensor 71. As shown in FIGS. 2 and 3, the inflator 10 includes a columnar body 10a having gas discharge ports 10b to discharge inflation gas G and a flange 10c projecting from the outer circumference of the body 10a in a generally square annular shape. The flange 10c includes apertures 10d for receiving bolts 19 of the retainer 16. The flange 10c is arranged to butt against the lower side of the bottom wall 7 of the case 6 at a region around the opening 7a while the bolts 19 of the retainer 16 are inserted through the apertures 10d. The flange 10c is then secured to the case 6 by fastening the bolts 19 with nuts 20.

As shown in FIGS. 2 and 3, the airbag cover 12 is integral with the dashboard 1 in this specific embodiment, and is disposed to cover the folded airbag 22 from above. The airbag cover 12 includes two doors 13 openable towards the front and rear and a thinned breakable region 12a disposed around the doors 13. The doors 13 are adapted to open when pushed by the airbag 22 upon airbag inflation by breaking the breakable region 12a. The airbag cover 12 is further provided with a joint wall 14 around the doors 13. The joint wall 14 includes retaining holes 14a retaining the lugs 8a of the circumferential wall 8 of the case 6, thereby the airbag cover 12 is coupled to the case 6.

As shown in FIGS. 2-4, the retainer 16 includes a bottom wall 17 arranged over the bottom wall 7 of the case 6 and a circumferential wall 18 extending upward in a generally square tubular fashion from the peripheral edge of the bottom wall 17. The retainer 16 holds a peripheral area of an inlet opening 24 of the airbag 22 for attachment onto the bottom wall 7 of the case 6 together with the inflator 10. The retainer 16 is provided with more than one bolts 19 (6 bolts, in this embodiment) projecting downward. Each of the bolts 19 is put through each of through holes 25 of the airbag 22 and each of the through holes 7b of the case 6. Four of the bolts 19 to be disposed proximate the inflator 10 are further inserted through the apertures 10d of the inflator 10. The retainer 16 secures the airbag 22 and the inflator 10 to the case 6 by fixing the bolts 19 into the nuts 20. As shown in FIG. 4, in a similar manner to the bottom wall 7 of the case 6, the bottom wall 17 of the retainer 17 is provided with an opening 17a for insertion of the inflator body 10a, an insert hole 17b for receiving the retaining ring 57 of the first valve body 55 but for through holes for receiving the bolts 19. Like the circumferential wall 8 of the case 6, the circumferential wall 18 includes an insert hole 18a for receiving the movable member 45 of the actuator 44 as shown in FIG. 4. The circumferential wall 18 further includes a joint region 18b (FIG. 3) to which a joint portion 39 disposed at a first end or case-side end 36b of the tether 36 is joined.

Figure 5:
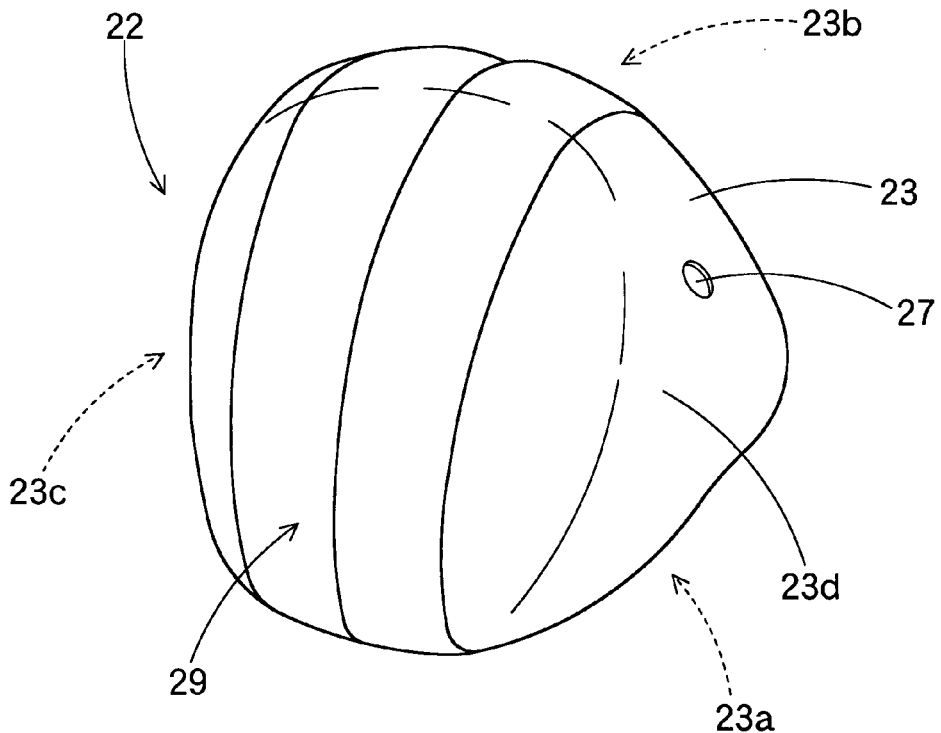
FIG. 5 is a perspective view of an airbag used for the airbag apparatus of FIG. 1 inflated by itself and viewed from the rear.
Figure 6:
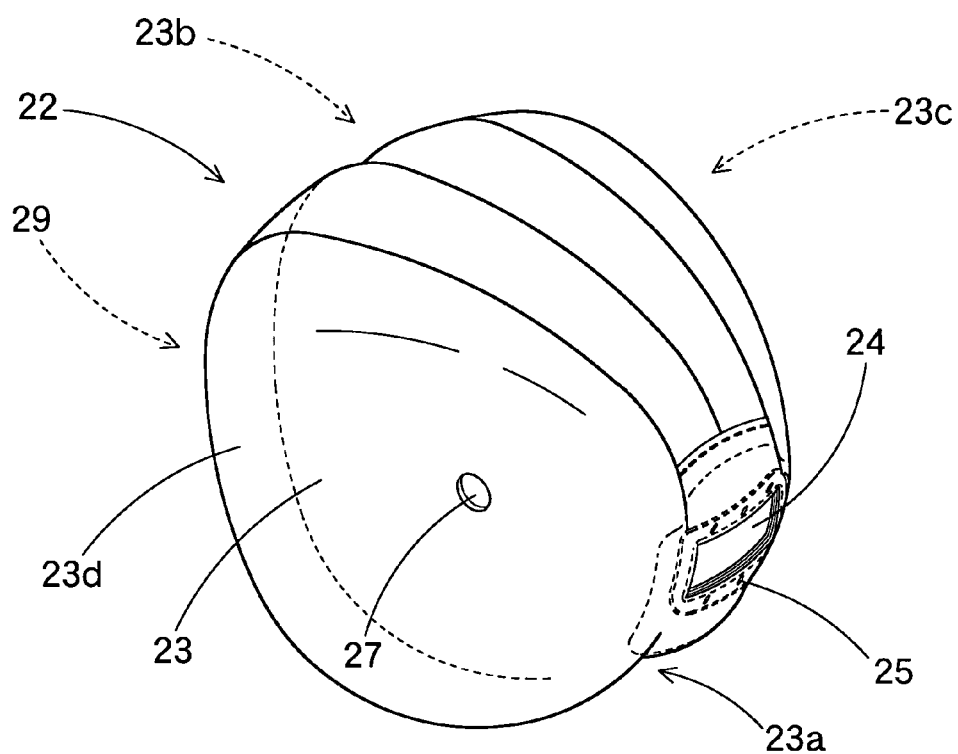
FIG. 6 is a perspective view of the airbag of FIG. 5 inflated by itself and viewed from the front.

As shown in FIGS. 5 and 6, describing the airbag 22 in a fully inflated state by itself, it has a generally conical shape whose top is located at the foremost region. The airbag 22 includes an occupant side wall 29 located at the rearmost region of the airbag 22 and forming the bottom face of the square cone and which bottom wall is adapted to receive the occupant P seated in the front passenger's seat S, and a circumferential wall 23 extending from the outer circumference of the occupant side wall 29 and narrowing toward the front. The circumferential wall 23 includes a bottom region 23a to butt against the top plane 2 of the dashboard 1 upon airbag deployment (FIG. 14), an upper region 23b to butt against the wind shield 4 (FIG. 14), a left side region 23c and a right side region 23d. The bottom region 23a is provided, on its front area, with a generally rectangular inlet opening 24 for introducing inflation gas G. The peripheral area of the inlet opening 24 is depressed by the bottom wall 17 of the retainer 16 and is attached to the bottom wall 7 of the case 6 (FIG. 2). Around the inlet opening 24 are through holes 25 for receiving the bolts 19 of the retainer 16 and an insert hole 26 for receiving the movable member 45 of the actuator 44 (FIG. 4). Each of the left side region 23c and the right side region 23d includes a vent hole 27.

Figure 9:
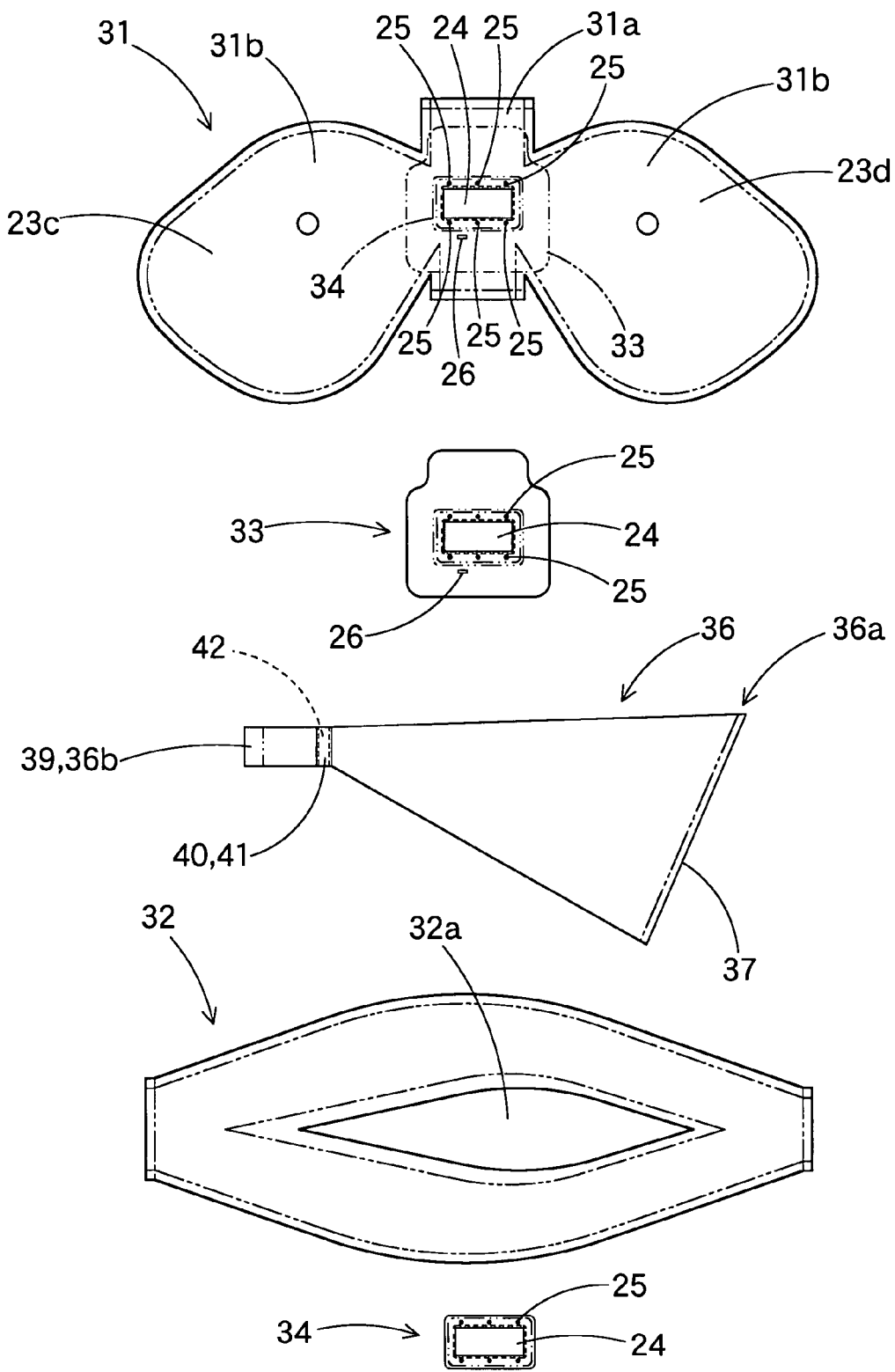
FIG. 9 illustrates components of the airbag of FIG. 5 by plan views.

As shown in FIG. 9, the airbag 22 is formed of a first base cloth 31, a second base cloth 32, and reinforcing cloths 33 and 34 for reinforcing the periphery of the inlet opening 24, all of which are made of woven fabric of polyester, polyamide and so on. The first base cloth 31 constitutes a front area of the bottom region 23a, a front area of the upper region 23b, the left side region 23c and the right side region 23d, of the circumferential wall 23. The second base cloth 32 constitutes remaining areas of the bottom region 23a and the upper region 23b and the occupant side wall 29. At the lateral center of the second base cloth 32 is a wide slit 32a extending along the vertical direction. This slit 32a is closed at the manufacturing of the airbag 22 with a second end or bag-side end 36a of the tether 36 put therein, thereby providing a joint portion 37 of the tether 36 and the airbag 22. The joint portion 37 helps provide a recessed area on the lateral center of the occupant side wall 29 in such a manner as to recess forward by being pulled by the tether 36. With this structure, regions of the occupant side wall 29 on the left and right sides of the recessed area, i.e. regions on the left and right sides of the slit 32a, absorb changes of lateral width of the airbag 22 irrespective of deployment modes of the airbag 22. More specifically, for example, describing a restrained-protrusion mode of the airbag 22 where the tether 36 is shortened on the basis of an increased-protrusion mode where the tether 36 is extended, the recessed area is recessed deeper by the shortened length of the tether 36. At this time, the airbag 22 protrudes relatively less rearward in a fully inflated state, which seems likely to increase the lateral width of the airbag 22. However, circumferential wall of the airbag 22 which would otherwise unfurl toward the left and right is pulled toward the recess recessing deep forward at the lateral center of the occupant side wall 29. Accordingly, the lateral width of the airbag 22 is not increased, so that the airbag 22 deploys without a change of the lateral width of the occupant side wall 29 both in the increased-protrusion mode and in the restrained-protrusion mode. As a result, the lateral width of a restraint area of the airbag 22 is stabilized between the deployment modes of the airbag 22.

Manufacturing of the airbag 22 begins with a sewing work of the reinforcing cloths 33 and 34 to a rectangular area 31a at the center of the first base cloth 31, together with a sewing work of parts of edges of left and right circular areas 31b of the first base cloth 31 proximate the rectangular area 31a to the rectangular area 31a. On the other hand, the bag-side end 36a of the tether 36 is disposed between the slit 32a of the second base cloth 32 and the slit 32a is sewn up for closure, thereby forming the joint portion 37 of the tether 36. Subsequently, left and right edges of the second base cloth 32 are sewn to corresponding outer edges of the left and right circular areas 31b and upper and lower ends of the second base cloth 32 are sewn to corresponding upper and lower edges of the rectangular area 31a of the first base cloth 31. Thereafter, the airbag 22 is reversed inside out from the inlet opening 24 so that seam allowances may not appear on the outer surface. Thus the airbag 22 including the tether 36 is completed.

Figure 7:
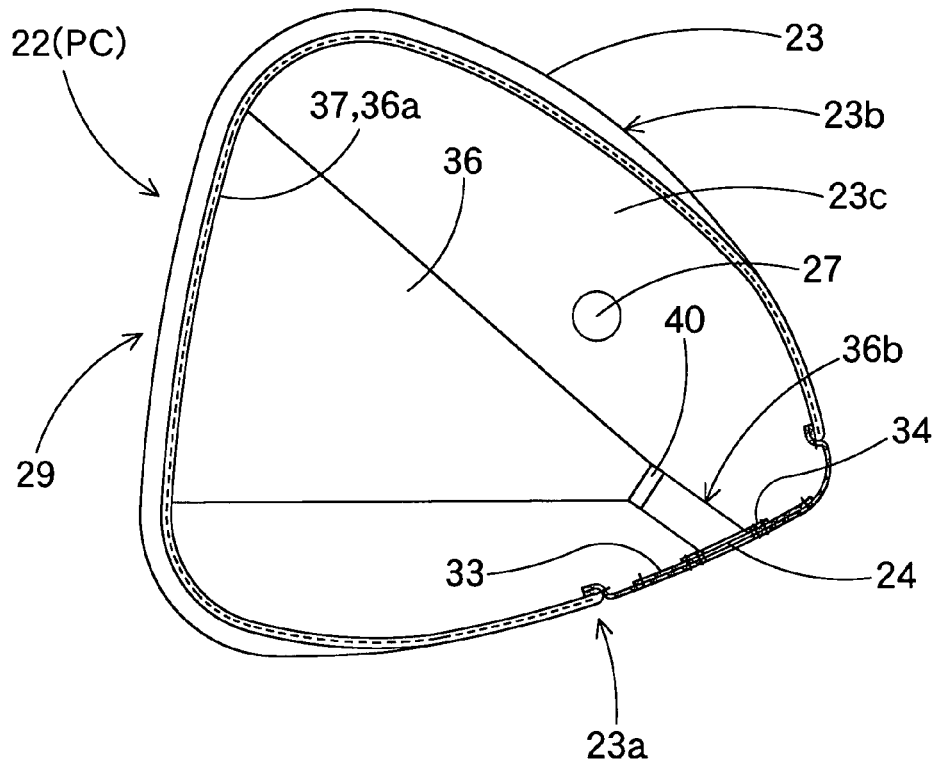
FIG. 7 is a schematic vertical section of the airbag of FIG. 5 taken along the longitudinal direction, showing the airbag inflated in the increased-protrusion mode.
Figure 8:
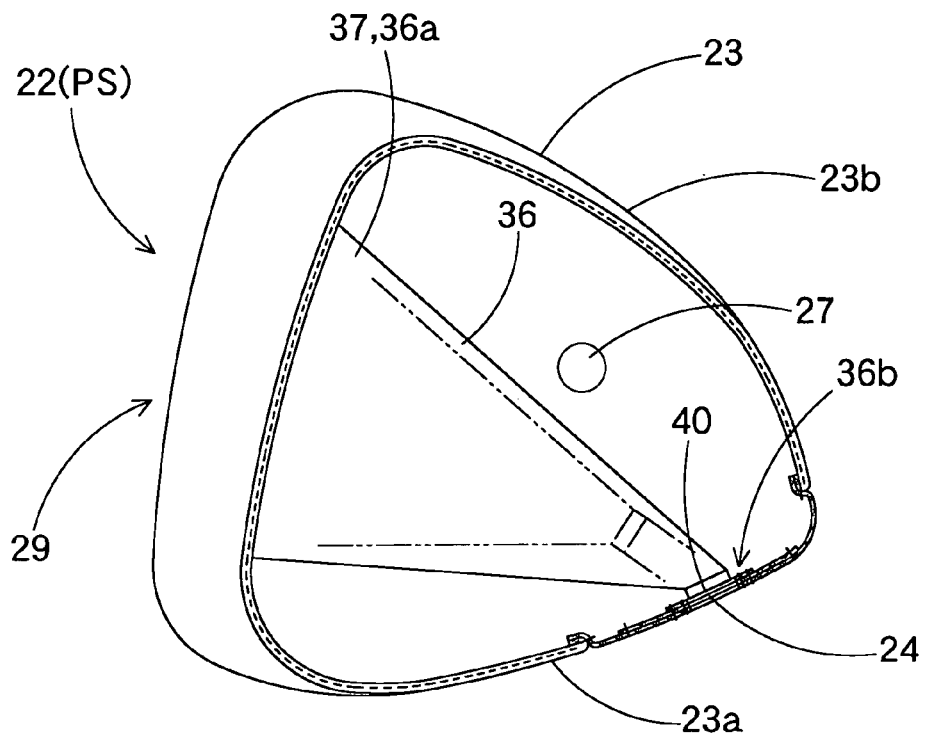
FIG. 8 is a schematic vertical section of the airbag of FIG. 5 taken along the longitudinal direction, showing the airbag inflated in the restrained-protrusion mode.

The tether 36 is formed of woven fabric of polyester, polyamide or the like, and has a triangular plate shape whose vertical width narrows from the bag-side end 36a toward the case-side end 36b as shown in FIGS. 7-9. As shown in FIG. 3, the case-side end 36b of the tether 36 has a joint portion 39 having a loop shape at its terminal. The joint portion 39 is arranged to wrap up the joint region 18b of the retainer 16 so it may not be detached from the case 6. In the vicinity of the joint portion 39 is an engagement portion 40 provided with a cylindrical collar 41. As shown in FIGS. 4 and 10A, the inner diameter of the collar 41 is sized to receive a later-described columnar leading end 46a of a retaining rod 46 of the movable member 45 of the actuator 44. The collar 41 receives the leading end 46a of the retaining rod 46 there inside to anchor the engagement portion 40 upon activation of the actuator 44.

If the engagement portion 40 is anchored toward the case 6 by the retaining rod 46 upon airbag deployment, the tether 36 regulates rearward protrusion of the airbag 22 in a shortened state from the engagement portion 40 to the joint portion 37 as shown in FIGS. 8, 13 and 14, so that the degree of protrusion from the case 6 at the joint portion 37 of the airbag 22 is suppressed, which is the restrained-protrusion mode PS. If the engagement portion 40 is disengaged from the retaining rod 46 upon airbag deployment, the tether 36 regulate the rearward protrusion of the airbag 22 by its full length from the joint portion 39 formed at the case-side end 36b to the joint portion 37 formed at the bag-side end 36a as shown in FIGS. 7, 16 and 17, so that the protrusion degree at the joint portion 37 of the airbag 22 is increased, which is the increased-protrusion mode PL.

As shown in FIGS. 3 and 4, the engagement portion 40 of the tether 36 is fitted in and held by a holder 62 when the airbag apparatus M is off duty. The holder 62 includes a groove 62a recessed in a semi-arcuate shape. The engagement portion 40 is held by the holder 62 in such a degree as to be disengaged therefrom if a tension force from the joint portion 37 caused by airbag inflation is applied to the engagement portion 40 in a state where the engagement portion 40 is not anchored by the retaining rod 46 of the actuator 44 upon airbag deployment.

Further, as shown in FIGS. 3 and 10A, a columnar stopping member 42 is put inside the collar 41 in a fitting manner. The stopping member 42 has the same length as the collar 41. When the retaining rod 46 of the movable member 45 is inserted through the collar 41 upon activation of the actuator 44 so it anchors the engagement portion 40, the stopping member 42 is pushed out of the collar 41 by the retaining rod 46 and then inserted through a later-described retaining ring 61 of a second valve body 60 so it holds the second valve body 60, as shown in FIG. 10C. That is, by holding the second valve body 60, the stopping member 42 prevents the valve body 60 from moving to open up the second vent opening 52.

The actuator 44 includes a movable member 45 having bifurcate retaining rods 46 and 47. The retaining rod 46 serving as a first retaining member extends toward the engagement portion 40 for retaining the tether 36. The retaining rod 47 serving as a second retaining member extends toward the first valve body 55 for retention of the first valve body 55 and has a leading end 47a turned around in a reversed J shape. A micro gas generator is used to activate the actuator 44. When an actuating signal is fed from the control device 70, explosives inside the gas generator are ignited to produce combustion gas, which moves the movable member 45 from the initial position A0 to the end position A1 as shown in FIGS. 4 and 12.

As shown in FIGS. 3 and 4, the vent mechanism 50 includes a first vent opening 51, a second vent opening 52, a first valve body 55 and a second valve body 60. The first vent opening 51 and the second vent opening 52 are formed on the bottom wall 7 of the case 6 and the bottom wall 17 of the retainer 16. In this specific embodiment, the openings 51 and 52 are communicated with each other and cooperatively form a single opening formed through the bottom walls 7 and 17 and expanding in the lateral direction.

The first valve body 55 and the second valve body 60 are pivotally supported by pivot portions 54 and 59 formed on the lower side of the bottom wall 7 of the case 6 so the valve bodies 55 and 60 turn around the pivot portions 54 and 59 to open the first vent opening 51 and the second vent opening 52.

As shown in FIGS. 4 and 11, when viewed from above the case 6, the first valve body 55 has its pivot portion 54 proximate a branch point 45a of the movable member 45 of the actuator 44, and has its leading end 55a to extend toward the leading end 47a of the retaining rod 47. The line connecting the pivot portion 54 and the leading end 55a of the first valve body 55 extends along the moving direction of the movable member 45. The valve body 55 includes a retaining ring 57 disposed in the vicinity of the leading end 55a in an upward-projecting manner. The retaining ring 57 is formed into a reversed U shape and is entered into the case 6 via the insert holes 7c and 17c of the bottom wall 7 of the case 6 and of the bottom wall 17 of the retainer 16. At the initial position of the retaining rod 47 of the movable member 45 of the actuator 44, the leading end 47a of the retaining rod 47 is inserted through the retaining ring 57. Hence the leading end 55a of the valve body 55 is held from moving downward. That is, when the retaining rod 47 is disposed at the initial position, the first valve body 55 keeps the first vent opening 51 closed. Then as shown in FIG. 12, when the actuator 44 is activated to move the movable member 45 to the end position A1, the leading end 47a of the retaining rod 47 is withdrawn from the retaining ring 57 and the retaining rod 47 stops retaining the first valve body 55. Hence the first valve body 55 is pushed and opened by the pressure of inflation gas G inside the case 6 so the first vent opening 51 opens up.

Referring to FIGS. 3 and 4, the pivot portion 59 of the second valve body 60 is formed toward the left side edge of the bottom wall 7 of the case 6. Although FIG. 4 shows as if the pivot portion 59 was disposed toward the right side edge, FIG. 3 shows a correct positional relationship based on the airbag apparatus mounted on a vehicle. The leading end 60a of the second valve body 60 extends toward the first valve body 55 or toward the right. The leading end 60a region is disposed above the top face of a left side region (right side region, in FIG. 4) of the first valve body 55. That is, the first valve body 55 holds the second valve body 60 from turning toward the opening direction. The valve body 60 includes on its top side the half-piped holder 62 holding the engagement portion 40 of the tether 36 as described above. The valve body 60 is further provided with a retaining ring 61 at a position facing away from the retaining rod 46 relative to the holder 62. The retaining ring 61 projects upward in a reversed U shape. The second valve body 60 is held from opening in the following instance. When the actuator 44 operates to shift the movable member 45 from the initial position A0 to the end position A1 with the engagement portion 40 held by the holder 62 as shown in FIG. 10A, the retaining rod 46 enters into the engagement portion 40 or collar 41 of the tether 36 and anchors the engagement portion 40. Then the stopping member 42 is pushed out of the collar 41 and inserted through the retaining ring 61 as shown in FIG. 10C. Consequently, the stopping member 42 holds the second valve body 60 from turning to open the second vent opening 52.

After the airbag apparatus M is mounted on the vehicle V, for example assuming that the control device 70 detected that an occupant P is seated proximate the airbag apparatus M based on a signal fed from the position sensor 73 and received a signal from the crash sensor 71 that informs of an impact on the vehicle V, the control device 70 feeds actuating signals to the inflator 10 and the actuator 44. Then the inflator 10 operates to discharge inflation gas G from the gas discharge ports 10b, so that the airbag 22 inflates with inflation gas G, breaks the breakable portion 12a of the airbag cover 12, opens the doors 13 toward the front and rear, and deploys rearward.

At this time, the actuator 44 also operates to move the movable member 45 from the initial position A0 (FIG. 4) to the end position A1 (FIG. 12), so that the leading end 46a of the retaining rod 46 enters into the collar 41 as shown in FIG. 10C from the state shown in FIG. 10A and anchors the engagement portion 40 of the tether 36. That is, the actuator 44 sets the tether for the restrained-protrusion mode PS. In the meantime, the leading end 47b of the retaining rod 47 is disengaged from the retaining ring 57 so the retaining rod 47 releases the first valve body 55 as shown in FIGS. 11A and 11B. Hence the first valve body 55 is pushed and opened by the pressure of inflation gas G inside the case 6 so the first vent opening 51 opens up. Then inflation gas G is emitted out of the first vent opening 51, and the vent mechanism 50 is set for a high-emission mode BL. At this time, the second valve body 60 is no longer held by the first valve body 55 from opening. However, the second valve body 60 keeps closing the second vent opening 52 since the stopping member 42 which has moved along with the movement of the retaining rod 46 of the movable member 45 now holds the retaining ring 61 (FIG. 10C). That is, as shown in FIGS. 13 and 14, the airbag 22 deploys in the restrained-protrusion mode PS and in the high-emission mode BL where the first vent opening 51 is open whereas the second vent opening 52 is closed. In this mode of deployment of the airbag 22, the airbag 22 inflates with a suppressed internal pressure and small volume so it protects the occupant P positioned proximate the airbag apparatus M with adequate cushioning effect and without pressing the occupant P unduly.

Assuming another instance where the control device 70 detected that an occupant P is in a normal position or remote position relative to the airbag apparatus M and received a signal from the crash sensor 71 that informs of an impact on the vehicle V, the control device 70 feeds an actuating signal to the inflator 10 but not to the actuator 44. Hence the actuator 44 is not activated, so that the retaining rods 46 and 47 of the movable member 15 stay at the initial position A0 as shown in FIG. 15. In this instance the vent mechanism 50 is determined on a low-emission mode BS shown in FIG. 16 where the first valve body 55 keeps closing the first vent opening 51 and the second valve body 60 keeps closing the second vent opening 52 because of the retention of the retaining ring 57 of the first valve body 55 by the leading end 47a of the retaining rod 47 and of the retention of the second valve body 60 by the first valve body 55. On the other hand, the tether 36 is determined on the increased-protrusion mode PL where the joint portion area 37 of the tether 36 is pulled by the inflating airbag 22 and the engagement portion 40 of the tether 36 is detached from the holder 62, i.e., a position RP where the engagement portion 40 would otherwise be anchored by the retaining rod 46 of the movable member 45 as shown in FIGS. 10A, 10B and 15 so that the engagement portion 40 is no longer engageable with the retaining rod 46. Hence the airbag 22 inflates with a high volume and high internal pressure so it protects the occupant P at normal position or remote from the airbag apparatus M with a sufficient reaction force and adequate cushioning effect. At this time, the engagement portion 40 is disengaged from the retention position RP by the retaining rod 46 together with the collar 41, so that the stopping member 42 is detached together with the collar 41 and leaves the second valve body 60 unretained.

At this point, that is, at a phase where the airbag 22 is deployed with the increased-protrusion mode PL of the tether 36 and the low-emission mode BS of the vent mechanism 50, if the control device 70 had detected that the occupant P seated at normal or remote position relative to the airbag apparatus M is small in stature, it activates the actuator 44 after estimating the timing for the airbag 22 to engage the occupant P. Then the tether 36 is kept in the increased-protrusion mode PL as shown in FIG. 15 because the engagement portion 40 of the tether 36 has been removed from the position RP where the engagement portion 40 would otherwise be retained by the retaining rod 46 of the movable member 45. On the other hand, the movable member 45 shifts to the end position A1 from the initial position A0 so that the leading end 47a of the retaining rod 47 stops retaining the first valve body 55 as shown in FIGS. 15, 18, 11A and 11B. Hence the first valve body 55 opens the first vent opening 51. The second valve body 60 opens the second vent opening 52, too, because the stopping member 42 has been removed from a position to retain the second valve body 60 and the first valve body 55 has moved to open the first vent opening 51 and no longer holds the second valve body 60. That is, the vent mechanism 50 switches to the maximum-emission mode BML from the low-emission mode BS as shown in FIG. 19. As a result, the airbag 22 keeps the high volume but reduces its internal pressure, which is an advantageous inflation mode for protecting the undersized occupant P seated at normal or remote position relative to the airbag apparatus M since the airbag 22 protects the occupant P softly by suppressing a reaction force.

As described above, the airbag apparatus M performs three restraint patterns, i.e. the small-volume, high-emission restraint pattern, the high-volume, low or no-emission restraint pattern, and the high-volume, maximum-emission restraint pattern. The small-volume, high-emission restraint pattern is a pattern where the actuator 44 is activated together with the inflator 10 so that the airbag 22 deploys under combination of the restrained-protrusion mode PS of the tether 36 and the high-emission mode BL of the vent mechanism 50. The high-volume, low or no-emission restraint pattern is a pattern where the actuator 44 is not activated at all whereas the inflator 10 is activated so that the airbag 22 deploys under combination of the increased-protrusion mode PL of the tether 36 and the low-emission mode BS of the vent mechanism 50. Further, the high-volume, maximum-emission restraint pattern is a pattern where the actuator 44 is activated after the airbag 22 is inflated by operation of the inflator 10 or after the engagement portion 40 of the tether 36 is removed from the position RP at which the engagement portion 40 would otherwise be retained by the retaining rod 46 of the movable member 45) so that the airbag 22 deploys under combination of the increased-protrusion mode PL of the tether 36 and the maximum-emission mode BML of the vent mechanism 50. The airbag 22 of the airbag apparatus M is deployable in the small-volume, high-emission restraint pattern, the high-volume, low or no-emission restraint pattern and in the high-volume, maximum-emission restraint pattern.

Therefore, according to the airbag apparatus M of the foregoing embodiment., the airbag 22 is deployable in the above-described three restraint patterns in spite of employing only one on-off control actuator 44, by adding a control to turn on the actuator 44 at delayed timing after airbag inflation and after the engagement portion 40 of the tether 36 is removed from the retention position RP, thereby protecting a vehicle occupant properly depending on the seating position and/or physical size of the occupant.

Although the vent mechanism 50 of the foregoing embodiment includes the second valve body 60 in addition to the first valve body 55, the mechanism 50 does not necessarily have to include the second valve body 60. In an instance where the vent mechanism 50 includes only the first valve body 55, the region of the second vent opening 52 is closed by either the bottom wall 7 of the case 6 or the bottom wall 17 of the retainer 16. With such a structure, if the actuator 44 is activated at the delayed timing as described above, the airbag 22 will deploy in the high-volume, high-emission restraint pattern which is the combination of the increased-protrusion mode PL of the tether 36 and the high-emission mode BL of the vent mechanism 50 with the first vent opening 51 opened.

In the instance where the actuator 44 is activated after the inflator 10 is activated, it is important to activate the actuator 44 after the engagement portion 40 of the tether 36 is detached from the position RP where the engagement portion 40 would otherwise be retained by the retaining rod 46. To this end, it will be appreciated to install a sensor proximate the holder 62 so the sensor directly or indirectly senses the disengagement of the engagement portion 40 from the retention position RP to determine the timing to activate the actuator 44. Alternatively, the timing may be determined by calculating the timing when the engagement portion 40 will certainly be removed from the retention position RP while considering the inflating manner of the airbag 22 after the activation of the inflator 10 so the actuator 44 will be activated when the calculated time period has passed after the activation of the inflator 10. Furthermore, the actuator 44 may be activated in time with the engagement of the occupant P with the occupant side wall 29 of the airbag 22 as in the foregoing embodiment.

It will also be appreciated to install a sensor on top of the top face 2 of the dashboard 1 or on an upper area of the windshield 4 for sensing the occupant side wall 29 to which the bag-side end 36a of the tether 36 is attached so that the sensor will help determine the timing to activate the actuator 44 after the engagement portion 40 is removed from the retention position RP.

In the foregoing embodiment, the bag-side end 36a of the tether 36 is joined to the vertical and lateral center region of the occupant side wall 29 of the airbag 22 to serve as the joint portion 37 while the case-side end 36b of the tether 36 is joined to the retainer 16 to serve as the joint region 39. However, the location of the airbag 22 to which the bag-side end 36a of the tether 36 is joined to provide the joint portion 37 should not be limited to the occupant side wall 29, but it has only to be a portion of the airbag 22 moving away from the case or airbag housing 6 upon airbag deployment. Hence the bag-side joint portion 37 may be located at a rear area of the upper region 23b of the circumferential wall 23, or at a rear area of the bottom region 23a of the circumferential wall 23. Further, the housing-side end 36b of the tether 36 may be joined to any such locations as to regulate the protruding degree of protruding regions of the airbag 22. For example, the housing-side joint portion 39 may be disposed on a peripheral area of the inlet opening 24 of the airbag 22 such as the bottom wall 17 of the retainer 16, the bottom wall 7 of the case 6, or the circumferential wall 8 of the case 6. Alternatively, the joint portion 39 may be disposed on an area of the airbag 22 around the inlet opening 24 which area is attached to the case 6.

It will also be appreciated that the housing-side joint portion 39 of the tether 36 is separated from the location to which it was joined on the increased-protrusion mode so that the tether 36 will be infinitely long to allow the airbag 22 to inflate freely. In other words, the tether 36 may be completely released from the location of housing on the increased-protrusion mode. In this arrangement, specifically, the engagement portion 40 of the tether 36 held by the holder 62 serves as the joint portion to the housing location and the tether 36 is formed without a region to be joined to the joint region 18b of the retainer 16.

Although the foregoing embodiment has been described as is applied to the airbag apparatus M for a front passenger's seat, the present invention may be applied to other kinds of airbag apparatuses, for example, for a driver's seat, for pedestrian protection, and so on.

What is claimed is:

1. An airbag apparatus comprising:
an airbag inflatable with inflation gas to protrude from a housing;
an actuator disposed at the housing and including a movable member for movement from an initial position to an end position;
a control device controlling a feed of inflation gas to the airbag for inflation and an activation of the actuator;
a vent mechanism for exhausting inflation gas, the mechanism including a first vent opening formed on the housing and a first valve body openably closing the vent opening for adjustment of emission of inflation gas to a low-emission mode or to a high-emission mode; and
a tether connecting part of the housing and a location on the airbag, the tether including, at an end area thereof closer to the housing, an engagement portion engageable with the movable member of the actuator for adjustment of a degree of protrusion of the airbag from the housing to an increased-protrusion mode or to a restrained-protrusion mode, wherein:
the engagement portion of the tether is retained at a location near the housing such that:
the engagement portion is detached from the location near the housing so as to preclude engagement between the engagement portion and the movable member of the actuator and thereby extending a length of the tether from the location of housing to a joint to the airbag to set the tether for the increased-protrusion mode when the airbag is inflated with the actuator inactivated to keep the movable member at the initial position; and such that
the engagement portion is engaged with the movable member of the actuator unless detached from the location near the housing thereby shortening the length of the tether from the location of housing to the joint to the airbag to set the tether for the restrained-protrusion mode when the airbag is inflated with the actuator activated; and
the valve body is attached at a location near the housing such that:
the valve body is engaged with the movable member to close off the vent opening and set the vent mechanism for a low-emission mode when the airbag is inflated with the actuator inactivated to keep the movable member at the initial position; and such that
the valve body is disengaged from the movable member to open up the vent opening to set the vent mechanism for a high-emission mode upon activation of the actuator; and
the movable member of the actuator is formed into a bifurcate configuration to include a first retaining member to retain the tether and a second retaining member to retain the valve body;
the engagement portion of the tether includes an annular collar into which a leading end of the first retaining member is inserted to retain the tether when the actuator is activated to move the movable member to the end position;
the collar is retained at the location near the housing in such a manner as to detach from the location near the housing so as not to be retained by the first retaining member when the airbag is inflated with the actuator inactive;
a leading end of the second retaining member is directed toward a direction opposite from the leading end of the first retaining member;
the valve body includes an annular portion receiving the leading end of the second retaining member such that the valve body is retained by the second retaining member when the actuator remains inactive to keep the movable member at the initial position; and
the leading end of the second retaining member is withdrawn from the annular portion of the valve body so as to allow the valve body to open up the vent opening when the actuator is activated to move the movable member to the end position.

2. An airbag apparatus comprising:
an airbag inflatable with inflation gas to protrude from a housing;
an actuator disposed at the housing and including a movable member for movement from an initial position to an end position;
a control device controlling a feed of inflation gas to the airbag for inflation and an activation of the actuator;
a vent mechanism for exhausting inflation gas, the mechanism including a first vent opening formed on the housing and a first valve body openably closing the vent opening for adjustment of emission of inflation gas to a low-emission mode or to a high-emission mode; and
a tether connecting part of the housing and a location on the airbag, the tether including, at an end area thereof closer to the housing, an engagement portion engageable with the movable member of the actuator for adjustment of a degree of protrusion of the airbag from the housing to an increased-protrusion mode or to a restrained-protrusion mode, wherein:
the engagement portion of the tether is retained at a location near the housing such that:
the engagement portion is detached from the location near the housing so as to preclude engagement between the engagement portion and the movable member of the actuator and thereby extending a length of the tether from the location of housing to a joint to the airbag to set the tether for the increased-protrusion mode when the airbag is inflated with the actuator inactivated to keep the movable member at the initial position; and such that
the engagement portion is engaged with the movable member of the actuator unless detached from the location near the housing thereby shortening the length of the tether from the location of housing to the joint to the airbag to set the tether for the restrained-protrusion mode when the airbag is inflated with the actuator activated; and the valve body is attached at a location near the housing such that:

the valve body is engaged with the movable member to close off the vent opening and set the vent mechanism for a low-emission mode when the airbag is inflated with the actuator inactivated to keep the movable member at the initial position; and such that the valve body is disengaged from the movable member to open up the vent opening to set the vent mechanism for a high-emission mode upon activation of the actuator; and the vent mechanism further includes a second vent opening formed on the housing and a second valve body openably closing the second vent opening;

the engagement portion of the tether further includes a stopping member for keeping the second valve body closing the second vent opening;

the stopping member is moved by the movable member of the actuator to a position to retain the second valve body such that the second valve body keeps closing the second vent opening when the actuator is activated during the restrained-protrusion mode of the tether whereas the stopping member is detached from the position to retain the second valve body when the airbag is inflated with the actuator inactive;

the second valve body is helped to close off the second vent opening by the first valve body closing off the first vent opening and supporting the second valve body in addition to by being retained by the stopping member upon the activation of the actuator; and the second valve body opens up the second vent opening when the stopping member is detached from the position to retain the second valve body after the airbag started to inflate with the actuator inactive and then the actuator is activated to allow the first valve body to open up the first vent opening and stop supporting the second valve body.

3. The airbag apparatus of claim 2, wherein:

the movable member of the actuator is formed into a bifurcate configuration to include a first retaining member to retain the tether and a second retaining member to retain the first valve body;

the first retaining member and the second retaining member are oriented toward opposite directions from each other at leading ends thereof;

the first valve body includes an annular portion receiving the leading end of the second retaining member such that the first valve body is retained by the second retaining member when the actuator remains inactive to keep the movable member at the initial position;

the leading end of the second retaining member is removed from the annular portion of the first valve body so as to allow the first valve body to open up the first vent opening when the actuator is activated to move the movable member to the end position;

the engagement portion of the tether includes an annular collar for receiving the leading end of the first retaining member so as to be retained by the first retaining member, the collar having the stopping member fitted inside thereof in a detachable manner before activation of the actuator;

the collar is retained at the location near the housing in such a manner as to detach from the location near the housing together with the stopping member so as not to be retained by the first retaining member when the airbag is inflated with the actuator inactive;

the stopping member is pushed out of the collar by the leading end of the first retaining member moved to be inserted through the collar to retain the tether when the actuator is activated to move the movable member to the end position;

the first vent opening and the second vent opening are arranged to form a single communicated opening;

the first valve body is disposed rotatably about a pivot portion formed on a periphery of the first vent opening and the second valve body is disposed rotatably about a pivot portion formed on a periphery of the second vent opening;

the second valve body is supported at a leading end area thereof by a region of the first valve body between the pivot portion and a leading end of the first valve body and thereby closing off the second vent opening; and the second valve body includes:

a holding member holding the collar toward the airbag housing in a detachable manner; and an annular portion adapted to be retained by the stopping member pushed out of the collar by the leading end of the first retaining member when the actuator is activated to move the movable member to the end position such that the second vent opening is kept closed.

4. An airbag apparatus comprising:

an airbag inflatable with inflation gas to protrude from a housing;

an actuator disposed at the housing and including a movable member for movement from an initial position to an end position;

a control device controlling a feed of inflation gas to the airbag for inflation and an activation of the actuator;

a vent mechanism for exhausting inflation gas, the mechanism including a first vent opening formed on the housing and a first valve body openably closing the vent opening for adjustment of emission of inflation gas to a low-emission mode or to a high-emission mode; and a tether connecting part of the housing and a location on the airbag, the tether including, at an end area thereof closer to the housing, an engagement portion engageable with the movable member of the actuator for adjustment of a degree of protrusion of the airbag from the housing to an increased-protrusion mode or to a restrained-protrusion mode, wherein:

the engagement portion of the tether is retained at a location near the housing such that:

the engagement portion is detached from the location near the housing so as to preclude engagement between the engagement portion and the movable member of the actuator and thereby extending a length of the tether from the location of housing to a joint to the airbag to set the tether for the increased-protrusion mode when the airbag is inflated with the actuator inactivated to keep the movable member at the initial position; and such that the engagement portion is engaged with the movable member of the actuator unless detached from the location near the housing thereby shortening the length of the tether from the location of housing to the joint to the airbag to set the tether for the restrained-protrusion mode when the airbag is inflated with the actuator activated; and the valve body is attached at a location near the housing such that:

the valve body is engaged with the movable member to close off the vent opening and set the vent mechanism for a low-emission mode when the airbag is inflated with the actuator inactivated to keep the movable member at the initial position; and such that the valve body is disengaged from the movable member to open up the vent opening to set the vent mechanism for a high-emission mode upon activation of the actuator; and the airbag includes an occupant side wall at a rear end area thereof protruding rearward upon deployment for restraint of an occupant;

an end area of the tether joined to the airbag is joined to a laterally central area of the occupant side wall such that the tether makes the laterally central area of the occupant side wall recessed forward upon airbag deployment; and the occupant side wall is designed to be recessed at the laterally central area even when the airbag is deployed in the increased-protrusion mode of the tether.

* * * * *